(12) United States Patent
Sakamoto

(10) Patent No.: US 6,829,025 B2
(45) Date of Patent: Dec. 7, 2004

(54) LIQUID CRYSTAL DISPLAY DEVICE EFFECTIVE AGAINST COLOR IRREGULARITY

(75) Inventor: Michiaki Sakamoto, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 23 days.

(21) Appl. No.: 10/357,178

(22) Filed: Feb. 3, 2003

(65) Prior Publication Data

US 2003/0151709 A1 Aug. 14, 2003

(30) Foreign Application Priority Data

Feb. 7, 2002 (JP) ........................................ 2002-031208

(51) Int. Cl.$^7$ ................................................. G02F 1/13
(52) U.S. Cl. ..................................... 349/114; 349/113
(58) Field of Search ................................. 349/114, 113, 349/130

(56) References Cited

U.S. PATENT DOCUMENTS 6,642,984 B1 * 11/2003 Yoshida et al. ............. 349/139
6,707,519 B1 * 3/2004 Okumura et al. ........... 349/114

FOREIGN PATENT DOCUMENTS

JP 2955277 7/1999 ........... G02F/1/136

* cited by examiner

Primary Examiner—James A. Dudek
(74) Attorney, Agent, or Firm—Hayes Soloway P.C.

(57) ABSTRACT

The thickness of a liquid crystal layer of a reflection type or semi-transparent type liquid crystal display device and the driving voltage are determined in such a manner that the reflectance of the liquid crystal layer to the blue light component has a maximum value; the values of reflectance to the red, green and blue light components are close to one another in the range lower than the driving voltage; the reflection type or semi-transparent type liquid crystal display device produces a full color image in the driving voltage range where the values of reflectance are close to one another so that the color irregularity and tint irregularity are suppressed.

17 Claims, 18 Drawing Sheets

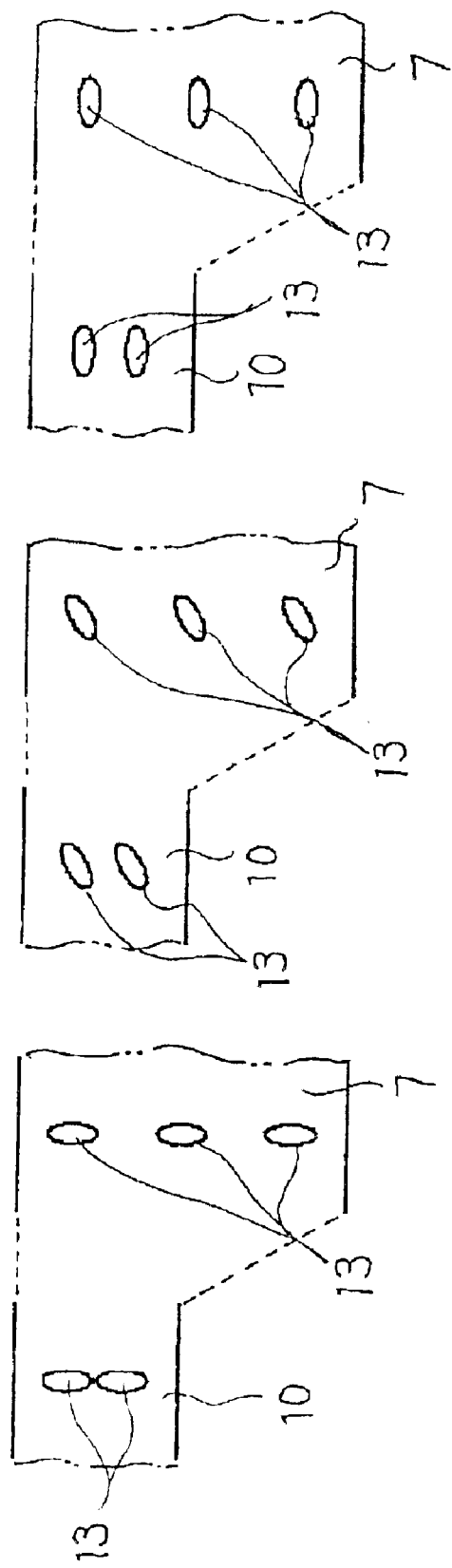

LIQUID CRYSTAL DISPLAY DEVICE EFFECTIVE AGAINST COLOR IRREGULARITY

FIELD OF THE INVENTION

This invention relates to a liquid crystal display device and, more particularly, to a liquid crystal display unit capable of producing visual images with the assistance of environmental light and/or back light.

DESCRIPTION OF THE RELATED ART

The liquid crystal display devices are categorized in a reflection type and a transparent type. A difference between the reflection type and the transparent type is the light source. The reflection type liquid crystal display device is equipped with a reflection plate, but does not have any built-in light source. On the other hand, the transparent type liquid crystal display device has a built-in light source, which is usually called as "back light source". Environmental light is incident on the reflection type liquid crystal display device, and is reflected on the reflection plate so that the liquid crystal produces a visual image with the assistance of the reflection light. On the other hand, the back light source radiates the back light, and the back light locally passes through the liquid crystal layer so that a visual images are produced.

The reflection type liquid crystal display device is thin, light and low power consumption, because any back light source is not required for the image production. These features are desirable for a portable electronic device such as a portable telephone. On the other hand, the transparent type liquid crystal display device can produce a visual image without the environmental light, and a clear visual image is produced thereon. In the following description, the image production without the back light is referred to as "reflection mode", and the image production through the back light is referred to as "transmission mode".

The common structure of the liquid crystal display devices includes a liquid crystal layer, a back light source or a reflection plate and a driving circuit. Various sorts of technologies have been employed in the liquid crystal layer, and are twisted nematic liquid crystal, which is usually abbreviated as "TN", a single polarization plate technology, super twisted nematic liquid crystal, which is usually abbreviated as "STN", a guest-host technology, a polymer dispersed liquid crystal, which is usually abbreviated as "PDLC" and cholesteric phase liquid crystal. The driving circuit makes the liquid crystal layer locally transparent. An active matrix driving circuit is popular. The active matrix driving circuit includes switching elements, which are implemented by thin film transistors or MIM (Meal-Insulator-Metal) diodes, and defines a matrix of pixels in the liquid crystal layer. The active matrix driving circuit makes the pixels selectively transparent and non-transparent so that a fine visual image is produced on the liquid crystal display device. The light, which is radiated from the back light source or reflected on the reflection plate, passes through the transparent pixels so that the fine visual image is produced.

There is a compromise between the transparent type liquid crystal display device and the reflection type liquid crystal display device. The compromise is hereinafter referred to as "semi-transparent type liquid crystal display device". A typical example of the semi-transparent type liquid crystal display device is disclosed in Japan Patent No. 2955277, and is shown in FIG. 1.

The prior art semi-transparent type liquid crystal display device includes pixels arranged in rows and columns, and each pixel electrode 1 occupies a rectangular area. The pixel electrode 1 has a reflection area 5 made of non-transparent metal and a transparent area 6 made of indium-tin-oxide, i.e., ITO, and both areas 5/6 are defined in the lower substrate structure. Gate lines 2 extend in parallel to one another in a direction parallel to the long side lines of the rectangular area, and drain lines 3 extend in parallel to one another in a direction parallel to the short end lines of the rectangular area. Thin film transistors 4 are respectively associated with the pixel electrodes 1. The gate electrodes of the thin film transistors 4 are connected to the associated gate lines 2, and the drain electrodes of the thin film transistors 4 are connected to the associated drain lines 3. The pixel electrodes 1 are connected to the source electrodes of the thin film transistors 4.

While the semi-transparent type liquid crystal display device is producing a visual image on the matrix of the pixels in the light, the back light source turns off, and the environment light is reflected on the reflection area 5 for producing the visual image. When a user brings the semi-transparent type liquid crystal display device in a dark room, the back light source turns on, and the back light passes through the transparent area 6 so that the visual image is clearly produced on the matrix of pixels. Thus, the environment light and back light are selectively used for the semi-transparent type liquid crystal display device. The semi-transparent type liquid crystal display device consumes the electric power the amount of which is less than that of the transparent type liquid crystal display device, and produces a clear image in the dark space.

A problem is encountered in the prior art standard semi-transparent type liquid crystal display device in that the output light intensity is hardly optimized due to the difference in length of optical path between the incident light and the back light. In other words, the retardation between the incident light and the back light is not ignoreable. In order to solve the problem, an insulting layer 8 is provided under the reflection area 5, and the reflection plate 9 is formed under the insulating layer 8 in the prior art semi-transparent liquid crystal display device disclosed in Japan Patent No. 2955277 as shown in FIG. 2. The insulating layer 8 makes the gap dr narrower than the gap df so as to cancel the different in length of optical path.

In order to maximize the luminance in the transmitted light in the semi-transparent type liquid crystal display device, the ECB mode, in which the twist angle is zero, is preferable. If the twist angle is 72 degrees in the transmission mode, the transmitted light available for the visual image is only 50%. When the twist angle is reduced to zero, the transmitted light available for a visual image is increased to 100%. Although the reflectance is maximized in the range between 2 microns and 3 microns in the reflection mode on the condition that the twist angle is 72 degrees, the reflectance is peaked at dr=1.5 microns on the condition that the twist angle is reduced to zero as shown in FIG. 3. For this reason, the wavelength dispersion is widened at zero degree rather than at 72 degrees. The visual image becomes yellowish when the gap is increased from the optimum gap. On the other hand, if the gap is decreased from the optimum gap, the visual image becomes bluish. Especially, the insulating layer 8 makes the surface of the lower substrate structure rolled, and, accordingly, the thickness of the liquid crystal is varied. The difference between the mean thickness and the maximum/minimum thickness is of the order of 0.3 micron. FIG. 4 shows chromaticity coordinates. In the chromaticity coordinates, the mean thickness of the liquid crystal is changed from 1.4 microns through 1.7 microns to 2.0 microns. When the mean thickness is 1.7 microns, the chromaticity is at (0.33, 0.35). When the liquid crystal is maximized at 2.0 microns thick, the chromaticity is changed to (0.37, 0.38), and the visual image is reddened. On the other hand, when the liquid crystal is minimized at 1.4 microns thick, the chromaticity is changed to (0.30, 0.32), and the visual image becomes yellowish. This is because of the fact that the peak reflectance of red, green and blue light components is offset as shown in FIG. 5. When the liquid crystal layer is less in thickness than 1.5 microns, at which the reflectance of the green light component is peaked, the reflectance of the red light component is rapidly reduced. On the other hand, when the liquid crystal layer is greater in thickness than 1.5 microns, the blue light component is rapidly reduced. Thus, the difference in reflectance among the red, green and blue light components makes the chromaticity varied.

The ECB mode and a VA mode, which will be described hereinbelow, are attractive to the manufacturers for liquid crystal display devices of the next generation. However, a problem is encountered in that the trial is varied in the reflection area 5 due to the wavelength dispersion. The problem is inherent in the prior art semi-transparent liquid crystal display device disclosed in Japan Patent No. 2955277, because the liquid crystal layer is unavoidably varied at ±0.3 micron thick.

SUMMARY OF THE INVENTION

It is therefore an important object of the present invention to provide a reflection type/semi-transparent type liquid crystal display device, which is small in wavelength dispersion, large in luminance and low in power consumption without sacrifice of the luminance.

In accordance with one aspect of the present invention, there is provided a reflection type or semi-transparent type liquid crystal display device comprising two substrate structures spaced from each other and including electrodes selectively formed therein so as to be selectively applied with a minimum potential difference and a maximum potential difference for creating local electric fields and color filters formed in one of the two substrate structures and a liquid crystal layer confined in the space between the two substrate structures and locally changed between transparent state and non-transparent state in the presence of the local electric fields for producing a color visual image, an the thickness of the liquid crystal layer and one of the minimum and maximum potential differences are determined in such a manner that a reflectance of the liquid crystal layer to one of the red, green and blue light components has an extreme value when the one of the minimum and maximum potential differences is applied between selected ones of the electrodes.

In accordance with another aspect of the present invention, there is provided a semi-transparent type liquid crystal display device comprising a first substrate structure including signal lines, thin film transistors selectively connected to the signal lines so as to be selectively changed between on-state for propagating data signals and off-state, reflecting electrodes connected to the associated thin film transistors for receiving the data signals in the on-state and transparent electrodes respectively paired with the reflecting electrodes and connected to the associated thin film transistors for receiving the data signals in the on-state, a second substrate structure including a counter electrodes opposed to the pairs of reflecting and transparent electrodes for creating local electric fields and a liquid crystal layer confined between the first substrate and the second substrate and applied with a minimum potential difference and a maximum potential difference between the pairs of reflecting and transparent electrodes and the counter electrode for partially becoming transparent in the presence of the local electric fields, and the liquid crystal molecules of the liquid crystal layer between the reflecting electrodes and the counter electrode and between the transparent electrodes and the counter electrode are oriented in a direction inclined from both of the horizontally oriented state and the vertically oriented state by a certain angle equal to or greater than 10 degrees in the presence of one of the minimum and maximum potential differences.

In accordance with yet another aspect of the present invention, there is provided a semi-transparent type liquid crystal display device comprising two substrate structures selectively formed with electrodes and having reflecting regions for reflecting light incident thereonto and transparent regions for passing back light and a liquid crystal layer confined in a space between the two substrate structures and selectively applied with a minimum potential difference and a maximum potential difference so as to be locally changed between transparent state and non-transparent state for producing a color visual image, and a gap in the transparent regions and one of the minimum and maximum potential differences are determined in such a manner that a reflectance of the liquid crystal layer to one of the red, green and blue light components has an extreme value.

BRIEF DESCRIPTION OF THE DRAWINGS

The features and advantages of the liquid crystal display device will be more clearly understood from the following description taken in conjunction with the accompanying drawings, in which FIGS. 16A to 16C are schematic views showing the orientation of liquid crystal molecules at respective values of a potential difference.

DESCRIPTION OF THE PREFERRED EMBODIMENTS

Figure 1:
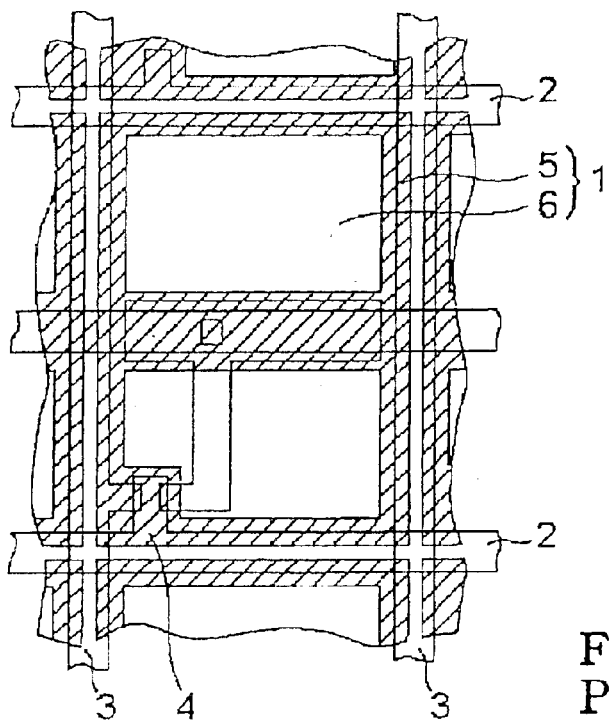
FIG. 1 is a plane view showing the arrangement in the semi-transparent type liquid crystal display device.
Figure 2:
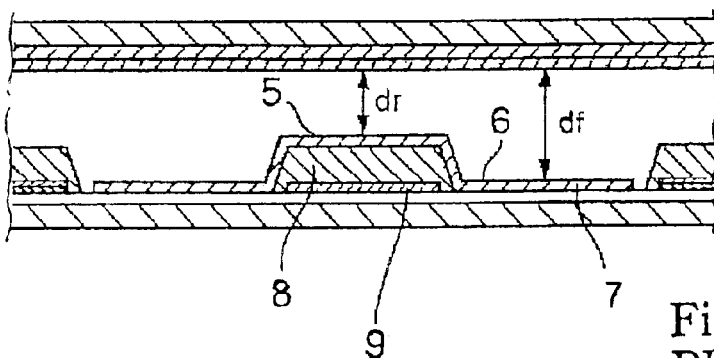
FIG. 2 is a cross sectional view showing the structure of the semi-transparent liquid crystal display device.
Figure 3:
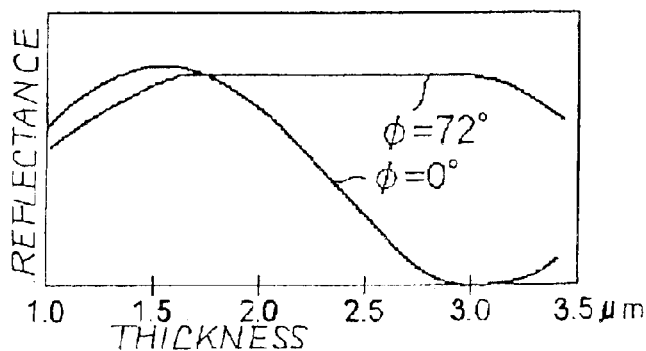
FIG. 3 is a graph showing the relation between the reflectance and the thickness of the liquid crystal.
Figure 4:
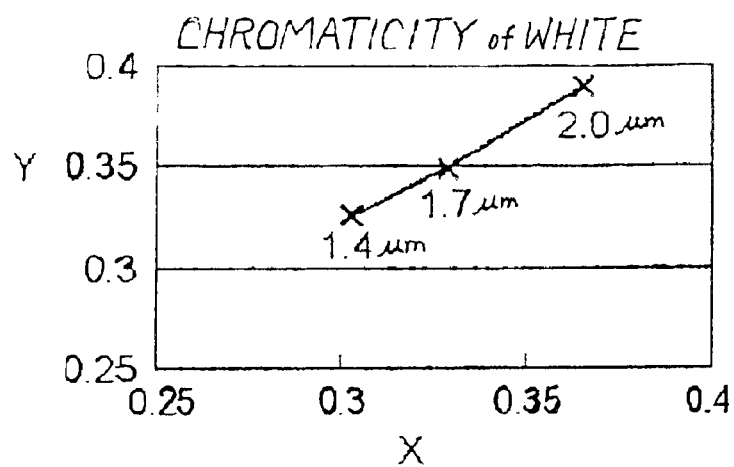
FIG. 4 is a graph showing the chromaticity coordinates for a white image.
Figure 5:
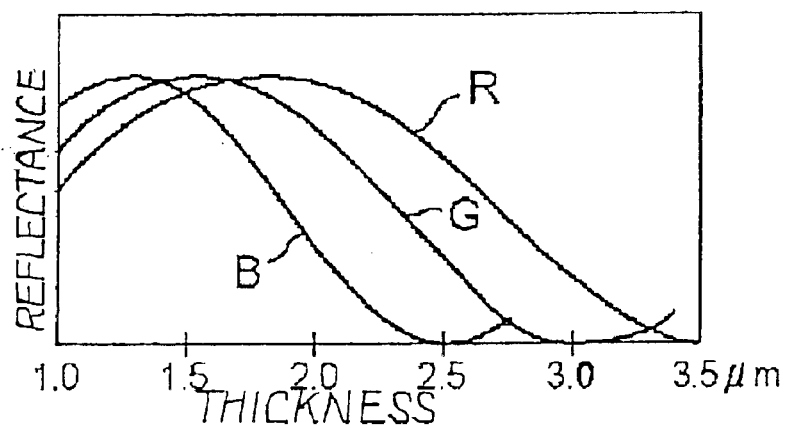
FIG. 5 is a graph showing the relation between the reflectance of red, green and blue light and the thickness of the liquid crystal.

The present invention is applicable to a reflection type liquid crystal display device and a semi-transparent type liquid crystal display device, and reflection type/semi-transparent type liquid crystal display devices embodying the present invention have several particular features. The following advantages are obtained by virtue of the particular features.

A liquid crystal display device embodying the present invention is of a reflection type or a semi-transparent type, and largely comprises two substrate structures and a liquid crystal layer. The substrate structures are spaced from each other so that the liquid crystal layer is confined in the space between the substrate structures. The substrate structures include electrodes selectively formed therein so that a minimum potential difference and a maximum potential difference are applied across the liquid crystal layer for creating local electric fields. Color filters are formed in one of the two substrate structures. When one of the maximum and minimum potential differences is applied across the liquid crystal layer, the liquid crystal layer is locally changed between transparent state and non-transparent state in the presence of the local electric fields for producing a color visual image. The thickness of the liquid crystal layer and one of the minimum and maximum potential differences are determined in such a manner that a reflectance of the liquid crystal layer to one of the red, green and blue light components has an extreme value when the aforesaid one of the minimum and maximum potential differences is applied between selected ones of the electrodes.

When the thickness and one of the minimum and maximum potential differences are determined such that the reflectance of one of the red, green and blue light components has an extreme value, the values of the reflectance to the red, green and blue light components are close to one another in the region larger in potential level than the minimum potential difference making the reflectance have the extreme value or in the region smaller in potential level than the maximum potential level. The reflecting type or semi-transparent type liquid crystal display device is operative to produce the color visual images in the region where the values of reflectance are close to one another. This results in that the color irregularity is effectively suppressed.

Especially, when the thickness and one of the minimum and maximum potential differences are determined such that the reflectance to the blue light component has an extreme value, the color irregularity is suppressed, and the tint is not widely varied over the screen.

The second reflection type or semi-transparent type liquid crystal display device includes all the feature of the aforementioned liquid crystal display device. One of the particular features is directed to the two substrate structures, which have horizontal orientation layers, respectively. In this instance, the liquid crystal molecules of the liquid crystal layer are obliquely oriented under application of the minimum potential difference and vertically oriented under application of the maximum potential difference.

The minimum potential difference is shifted from the potential difference for horizontally orienting the liquid crystal molecules to the positive side. The reflecting characteristics of the liquid crystal layer to the red, green and blue light components are close to one another. This feature is desirable, because the color irregularity is suppressed. Since the horizontal orientation layers are more reliable than vertical orientation layers, the liquid crystal display device is stable in image production.

The third reflection type or semi-transparent type liquid crystal display device includes all the features of the second liquid crystal display device. One of the particular features is the reflectance to the aforesaid one of the red, green and blue light components having the maximum value when the minimum potential difference is applied. When the liquid crystal molecules are vertically oriented, the liquid crystal display device produces a black screen. The liquid crystal layer perfectly shields the light, and achieves a good contract.

The fourth reflection type or semi-transparent type liquid crystal display device includes all the features of the second liquid crystal display device. One of the particular features is directed to the reflectance to the aforesaid one of the red, green and blue light components having the minimum value when the minimum potential difference is applied. When the liquid crystal display device is powered off, a dark screen is produced. The dark screen is like the screen of a normally-off type liquid crystal display device.

The fifth reflection type or semi-transparent type liquid crystal display device includes all the features of one of the second, third and fourth liquid crystal display devices. The particular feature of the fifth liquid crystal display device is directed to a twist angle between the horizontal orientation layers which is equal to or less than 10 degrees. The sixth reflection type or semi-transparent type liquid crystal display device includes all the features of the fifth liquid crystal display device. The particular feature of the sixth liquid crystal display device is directed to a retardation of the liquid crystal layer which has a mean value between 138 nanometers and 172 nanometers. The light utilization factor is high, and the visual image exhibits a high luminance.

The seventh reflection type or semi-transparent type liquid crystal display device includes all the features of one of the second to fourth liquid crystal display devices. The particular feature is directed to a twist angle between the horizontal orientation layers which is fallen within the range between 10 degrees and 45 degrees. The eighth reflection type or semi-transparent type liquid crystal display device includes all the features of the seventh liquid crystal display device, and the particular feature of the eighth liquid crystal display device is directed to a retardation of the liquid crystal layer which has a mean value between 123 nanometers and 157 nanometers. The color irregularity and undesirable variation of tint are effectively suppressed, and the light utilization factor is improved.

The ninth reflection type or semi-transparent type liquid crystal display device includes all the features of the first liquid crystal display device. The particular feature is directed to the two substrate structures which have vertical orientation layers, respectively, so that the liquid crystal molecules of the liquid crystal layer are obliquely oriented under application of the maximum potential difference and vertically oriented under application of the minimum potential difference. The manufacturer can set the minimum potential difference to zero so that the screen in the power off-state is made same as that in the application of the minimum potential difference.

The tenth reflection type or semi-transparent type liquid crystal display device includes all the features of the ninth liquid crystal display device. The particular feature is directed to the reflectance to the aforesaid one of the red, green and blue light components which has the maximum value when the maximum potential difference is applied. The tenth liquid crystal display device is of the normally-black type. The manufacturer can set the minimum potential difference and maximum potential difference to zero and a certain value lower than the potential difference for the horizontally oriented state. Thus, the tenth liquid crystal display device is operable in a lower potential level, and the power consumption is reduced.

The eleventh reflection type or semi-transparent type liquid crystal display device includes all the features of one of the ninth and tenth liquid crystal display devices. The particular feature of the eleventh liquid crystal display device is directed to a retardation of the liquid crystal layer which has a mean value between 138 nanometers and 172 nanometers. The light utilization factor is high, and a visual image is produced at a high luminance.

The twelfth semi-transparent type liquid crystal display device comprises a first substrate structure including signal lines, thin film transistors selectively connected to the signal lines so as to be selectively changed between on-state for propagating data signals and off-state, reflecting electrodes connected to the associated thin film transistors for receiving the data signals in the on-state and transparent electrodes respectively paired with the reflecting electrodes and connected to the associated thin film transistors for receiving the data signals in the on-state, a second substrate structure including a counter electrodes opposed to the pairs of reflecting and transparent electrodes for creating local electric fields, and a liquid crystal layer confined between the first substrate and the second substrate, and applied with a minimum potential difference and a maximum potential difference between the pairs of reflecting and transparent electrodes and the counter electrode for partially becoming transparent in the presence of the local electric fields, and the liquid crystal molecules of the liquid crystal layer between the reflecting electrodes and the counter electrode and between the transparent electrodes and the counter electrode are oriented in a direction inclined from both of the horizontally oriented state and the vertically oriented state by a certain angle equal to or greater than 10 degrees in the presence of one of the minimum and maximum potential differences. By virtue of the angle under the application of one of the maximum and minimum potential differences, the color irregularity and undesirable tint variation are effectively suppressed.

The thirteenth semi-transparent type liquid crystal display device includes all the features of the twelfth liquid crystal display device. The particular features are directed to the liquid crystal molecules which are in the horizontally oriented state without any potential difference between the pairs of reflecting and transparent electrodes and the counter electrode and to the minimum potential difference equal to or greater than 0.5 volt. Thus, the minimum potential difference is shifted from that for the horizontally oriented state. This feature is desirable for suppressing the color irregularity.

The fourteenth semi-transparent type liquid crystal display device includes all the features of the twelfth liquid crystal display device. The particular features are directed to the liquid crystal molecules which are in the vertically oriented state when the minimum potential difference is applied and to the minimum potential difference equal to or less than 0.5 volt. The vertically oriented state is obtained in the presence of the minimum potential difference so that the color irregularity is suppressed.

The fifteenth semi-transparent type liquid crystal display device comprises two substrate structures selectively formed with electrodes and having reflecting regions for reflecting light incident thereonto and transparent regions for passing back light and a liquid crystal layer confined in a space between the two substrate structures, and selectively applied with a minimum potential difference and a maximum potential difference so as to be locally changed between transparent state and non-transparent state for producing a color visual image, and a gap in the transparent regions and one of the minimum and maximum potential differences are determined in such a manner that a reflectance of the liquid crystal layer to one of the red, green and blue light components has an extreme value.

In both of the reflecting region and the transparent region, the values of the reflectance to the red, green and blue light components are close to one another in the region larger in potential level than the minimum potential difference for making the reflectance exhibit the extreme value or in the region smaller in potential level than the maximum potential difference for making the reflectance exhibit the extreme value. The fifteenth liquid crystal display device is operative to produce a visual image in the region where the values of reflectance are close to one another. The color irregularity and undesirable tint variation are suppressed. Especially, if the gap and the aforesaid one of the minimum and maximum potential differences are determined such that the reflectance to the blue light component has an extreme value, the color irregularity and the undesirable tint variation are strongly suppressed.

The sixteenth semi-transparent type liquid crystal display device includes all the features of the fifteenth liquid crystal display device. The particular features are directed to the two substrate structures which have respective horizontal orientation layers held in contact with the liquid crystal layer and to the liquid crystal molecules obliquely oriented in the presence of the minimum potential difference and vertically oriented in the presence of the maximum potential difference. The minimum potential difference is shifted from the potential difference for the horizontally oriented state to the positive side so that the reflecting characteristics of the read, green and blue light components are made close to one another. This results in that the color irregularity is suppressed. Since the horizontal orientation layers are more reliable rather than vertical orientation layers, the sixteenth liquid crystal display device is stable in image production.

The seventeenth semi-transparent type liquid crystal display device includes all the features of the fifteenth liquid crystal display device. The particular features are directed to the two substrate structures which have respective vertical orientation layers held in contact with the liquid crystal layer and to the liquid crystal molecules obliquely oriented in the presence of the maximum potential difference and vertically oriented in the presence of the minimum potential difference. Since the manufacturer can adjust the minimum potential difference to zero, the screen in the power-off state is same as that in the application of the minimum potential difference.

First Embodiment

Figure 6A:
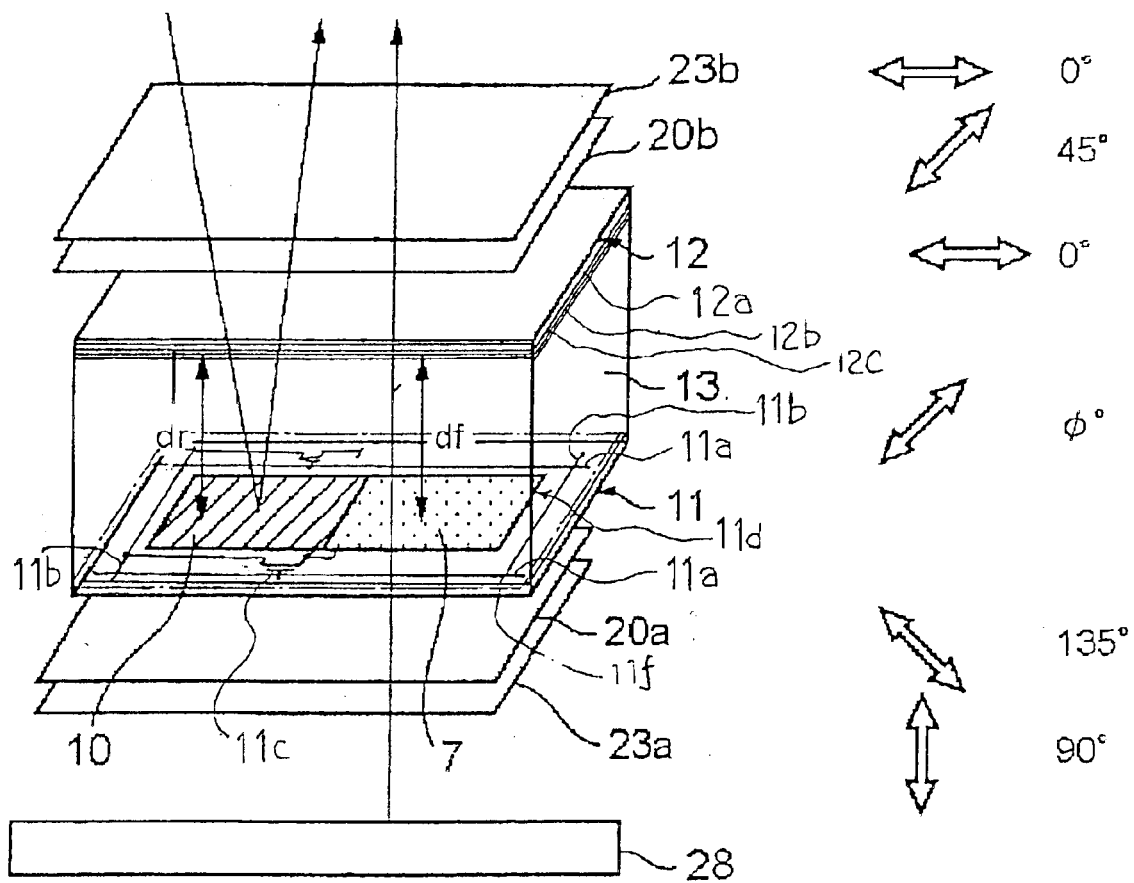
FIG. 6A is a schematic perspective view showing the arrangement of component parts of a semi-transparent type liquid crystal display device according to the present invention and polarized state in the component parts.

Referring to FIG. 6A of the drawings, a semi-transparent type liquid crystal display device embodying the present invention comprises a substrate structure 11, a counter substrate structure 12 and liquid crystal 13. The counter substrate structure 12 is spaced from the substrate structure 11, and the liquid crystal 13 is confined between the substrate structure 11 and the counter substrate structure 12. Scanning signal lines 11a, data signal lines 11b, thin film transistors 11c and pixel electrodes 11d are formed in the substrate structure 11, and adjacent two scanning signal lines 11a, adjacent two data signal lines 11b, each thin film transistor 11c and associated pixel electrode 11d define one of the pixel electrodes 11d. Each of the pixel electrodes 11d has a transparent electrode 7 and a reflection electrode 10. The region where the light is transmitted through the transparent electrode 7 is hereinafter referred to as "transmitting region", and the region where the light is reflected on the reflection electrode 10 is referred to as "reflecting region".

The scanning signal lines 11a extend perpendicular to the data signal lines 11b without electric contact. The gate electrodes of the thin film transistors 11c are selectively connected to the scanning signal lines 11a, and the drain electrodes of the thin film transistors 11c are selectively connected to the data signal lines 11b. The source electrodes of the thin film transistors 11c are respectively connected to the pixel electrodes 11d.

On the other hand, a counter electrode 12a is formed in the counter substrate structure 12, and local electric fields are selectively created between the pixel electrodes 11d and the coupler electrode 12a. The counter substrate structure 12 further includes a black matrix/color filters 12c. The black matrix has windrows, i.e. vacant spaces, and the windows are overlapped with the pixel electrodes 11d. The windows are closed with the color filters so that the light from the pixel electrodes 11d passes through the color filters. The color filters are selectively colored in red, green and blue, and a set of red, green and blue filters forms a part of each pixel. Thus, a pixel produces a dot of a full color visual image.

The scanning signal lines 11a are sequentially changed to active level so that the image carrying signals are supplied from the data signal lines 11b through the thin film transistors 11c to the selected ones of the pixel electrodes 11d. High voltage and low voltage are selectively applied to the pixel electrodes 11d, and the high voltage creates local electric fields between the pixel electrodes 11d and the counter electrode 12a. The local electric fields change the transparency of the pieces of the liquid crystal so that the transparent pixels and non-transparent pixels take place for producing a visual image. The three dimensional structure of the substrate structure 11 is well known to skilled persons, and no further description is not incorporated hereinafter.

Figure 6B:
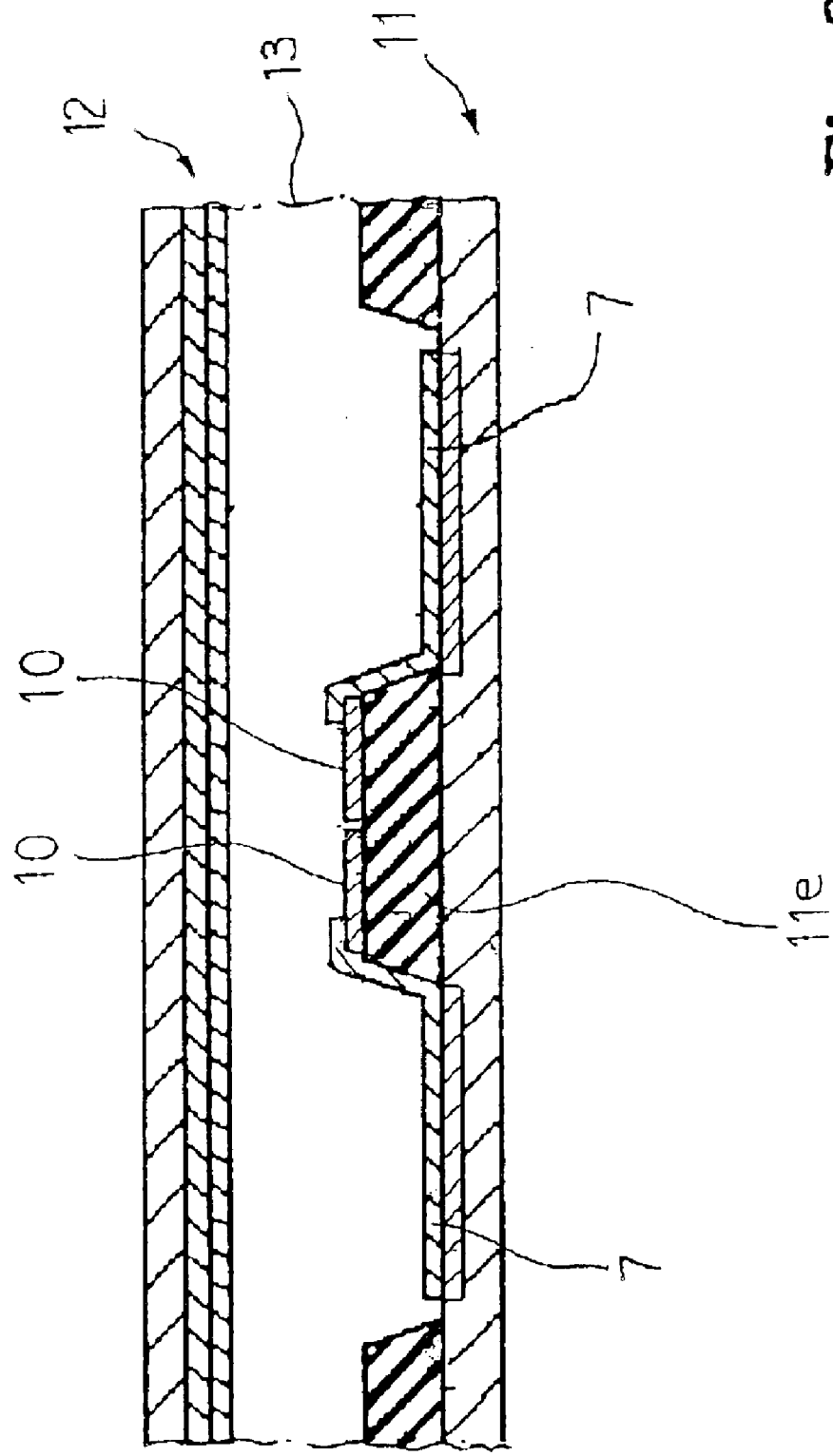
FIG. 6B is a schematic cross sectional view showing the arrangement of a transparent electrode and a reflection electrode both serving as a pixel electrode.

The substrate structure 11 further includes an insulting layer 11e (see FIG. 6B), and the reflection electrode 10 is formed on the insulating layer 11e. The reflection electrodes 10 are electrically connected to the associated transparent electrode 7, and further serve as a reflection plate.

The substrate structure 11 and counter substrate structure 12 further include orientation layers 11f/12b, respectively, and the liquid crystal 13 is held in contact with the orientation layers 11f/12b. In case where horizontal orientation layers 11f/12b are used in the semi-transparent type liquid crystal display device, the angle between the two horizontal orientation layers 11f/12b is called as "twist angle". However, if vertical orientation layers are used, the vertical orientation layers are oriented in the same direction, and the twist angle is zero. In this instance, the substrate structures 11/12 are covered with the horizontal orientation layers 11f/12b. Assuming now that any potential difference is not applied between the substrate structures 11 and 12, the liquid crystal molecules 13 are horizontally oriented.

The semi-transparent type liquid crystal display device further comprises quarter wave plates 20a/20b, polarizing plates 23a/23b and a back light source 28. The quarter wave plates 20a/20b are laminated on the outer surfaces of the substrate structures 11/12, respectively, and the polarizing plates 20a/20b are laminated on the outer surfaces of the quarter wave plates 20a/20b, respectively. The back light source 28 is provided in the vicinity of the polarizing plate 23a, and radiates back light toward the polarizing plate 23a.

Arrangement of Quarter Wave Plate 20b and Polarization Plate 23b

In order to make the semi-transparent liquid crystal display device normally white, the polarization plate 23b is to be seen in white in the condition that pixel electrodes 11d and counter electrode 12a, which are equal in potential level to each other, make the liquid crystal molecules 13 parallel to the major surface of the transparent substrate of the substrate structure 11. On the other hand, when the potential difference between the pixel electrodes 11d and the counter electrode 12a raises the liquid crystal molecules toward the vertical direction, the polarization plate 23b is to be seen in black. For this reason, the quarter wave plate 20b is inserted between the counter substrate structure 12 and the polarization plate 23b, and is different at 45 degrees with respect to the optic axis of the polarization plate 23b.

Environment light is assumed to be incident on the polarization plate 23b. The light passing through the polarization plate 23b is the linearly polarized light, i.e., horizontal, and the quarter wave plate 20b changes the environment light from the linearly polarized light to the right-handed circularly polarized light. If the gap dr is appropriately adjusted, the environment light reaches the reflection electrode 10 as the linearly polarized light, and is reflected on the reflection electrode 10. The reflected light is the linearly polarized light. The reflected light passes the liquid crystal layer 13, and is changed from the linearly polarized light to the right-handed circularly polarized light. The quarter wave plate 20b changes the reflected light from the right-handed circularly polarized light to the linearly polarized light, i.e., horizontal, and, thereafter, passes through the polarization plate 23b with the horizontal optic axis. As a result, the polarization plate 23b is seen in white.

When a potential difference is applied across the liquid crystal layer 13, the electric field is created, and raises the liquid crystal molecules. In other words, the liquid crystal molecules 13 are vertically oriented. The right-handed circularly polarized light is incident on the liquid crystal layer 13, and reaches the reflection electrode 10. The right-handed circularly polarized light is reflected on the reflection electrode 10, and is changed to the left-handed circularly polarized light. The left-handed circularly polarized light is output from the liquid crystal layer 13, and the quarter wave plate 20b changes the reflected light from the left-handed circularly polarized light to the linearly polarized light in the vertical direction. For this reason, the polarization plate 23b does not permit the linearly polarized light to pass therethrough. This results in the black polarization plate.

Quarter Wave Plate 20a and Polarization Plate 23a

The angle of optic axis in the quarter wave plate 20a/polarization plate 23a is arranged in such a manner that the polarization plate 23b prohibits the back light from outputting. The polarization plates 23a and 23b are arranged in such a manner as to be different at 90 degrees, i.e., the cross Nichol's position. In order to compensate the quarter wave plate 20a for the influences of the quarter wave plate 20b, the quarter wave plate 20a is also different from the other quarter wave plate 20b at 90 degrees. The liquid crystal molecules are raised under the application of the potential difference, and are vertically oriented. This results in that the light does not change the polarized state. For this reason, it is optically equivalent to the polarization plates 23a/23b arranged at the cross Nichol's position, and the polarization plate 23b is seen in black under the application of the potential difference.

Tint in the Reflecting Region

Figure 7A:
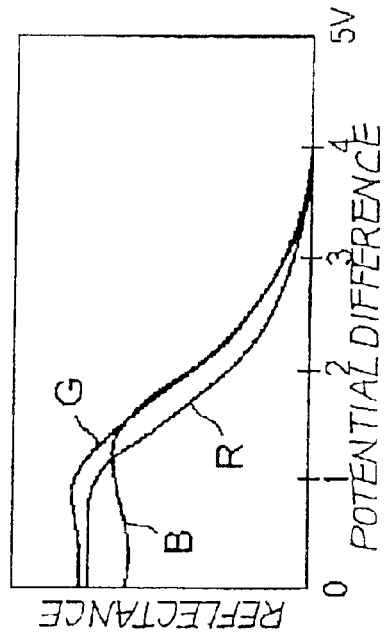
FIGS. 7A to 7C are graphs showing relation between reflectance and potential difference at different gaps between substrate structures of the semi-transparent type liquid crystal display device.
Figure 7B:
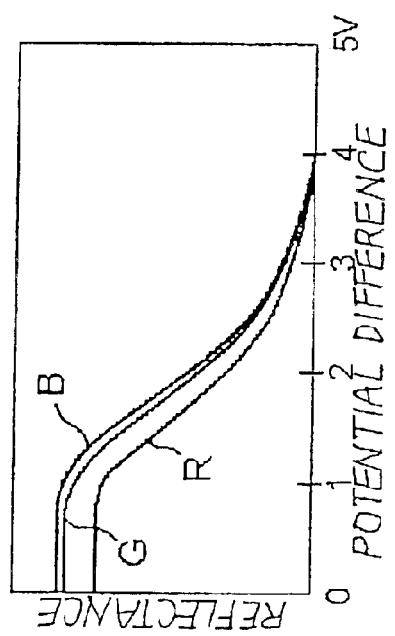
Figure 7C:
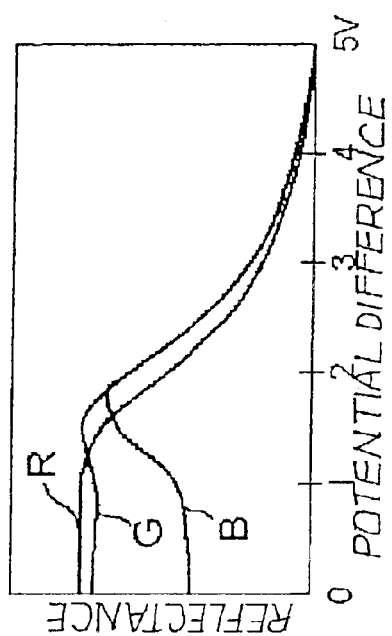

The present inventor investigated samples of the semi-transparent liquid crystal display device through a simulation, the polarization plates 23a/23b and quarter wave plates 20a/20b of the samples were arranged as described hereinbefore. The present inventor adjusted the twist angle of the liquid crystal to zero. The first sample had the gap dr adjusted to 1.4 microns, the gap dr of the second sample was adjusted to 1.7 microns, and the third sample had the gap dr adjusted to 2.0 microns. The present inventor applied a potential difference between the pixel electrode 11d and the counter electrode 12a, and determined the relation between the potential difference and the reflectance of the liquid crystal to the red, green and blue light components. The present inventor plots the reflectance in terms of the potential difference as shown in FIGS. 7A to 7C.

Comparing the reflectance of the liquid crystal 13 to the blue light component at zero volt, when the liquid crystal layer was increased, the reflectance was reduced. Nevertheless, the reflectance to the three primary color components R/G/B were close to one another at 1.5 volts, and the gap dr was less influential.

Figure 8:
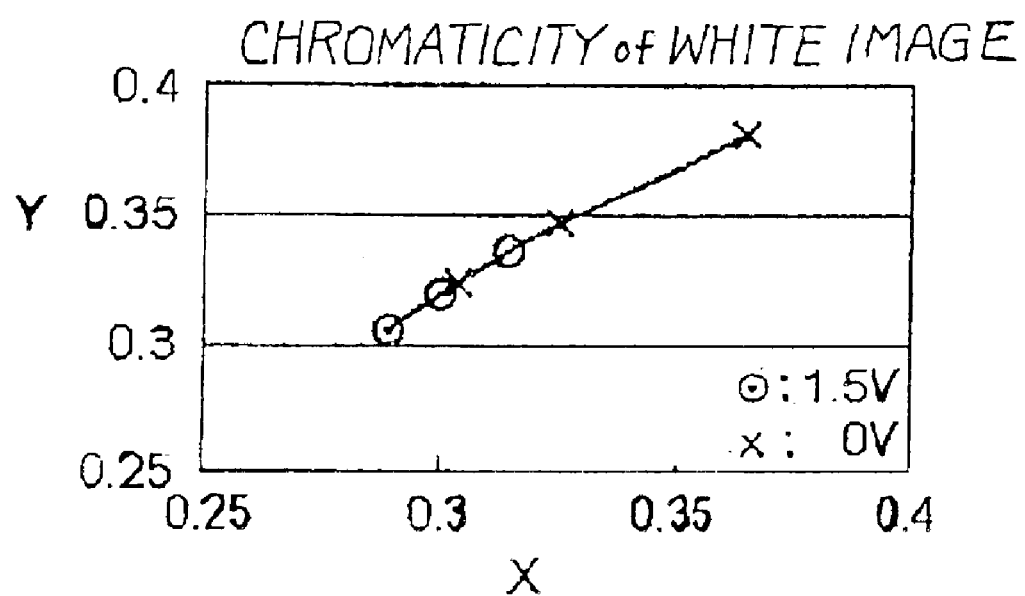
FIG. 8 is graph showing chromaticity coordinates for a white image.
Figure 9A:
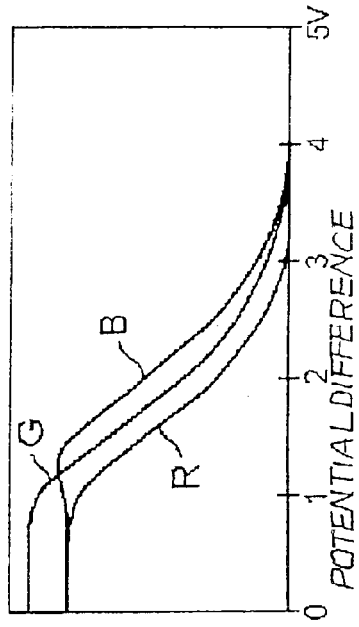
FIGS. 9A to 9D are graphs showing relation between the transmittance and the potential difference applied across liquid crystal layer at different values of gap.
Figure 9B:
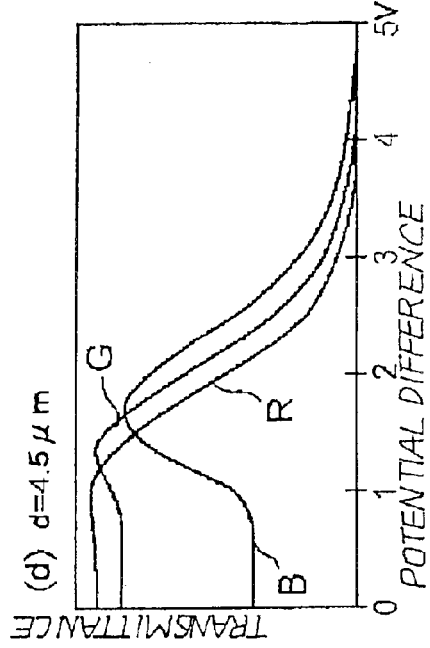
Figure 9C:
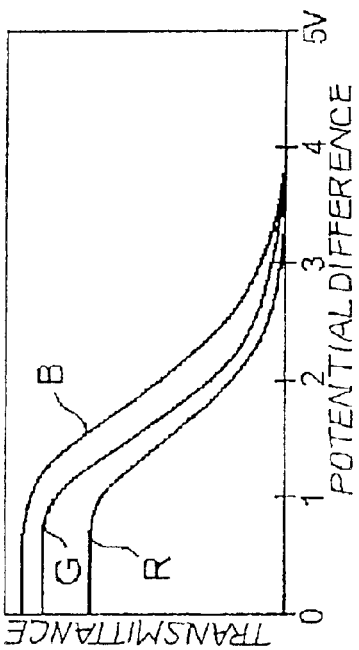
Figure 9D:
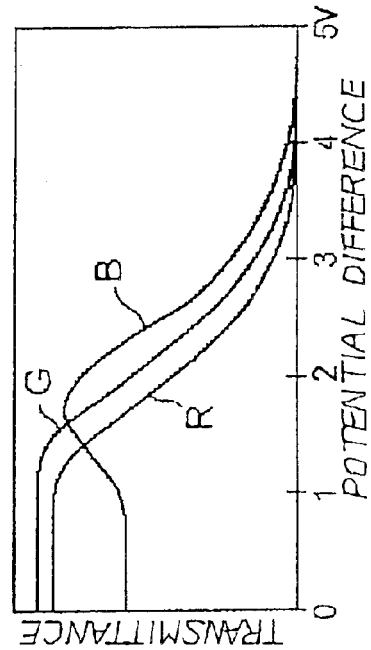

The present inventor plotted the tint of white color at zero volt and 1.5 volts in the chromaticity coordinates (see FIG. 8). When the potential difference was zero, the plots were widely spaced at 1.4 microns, 1.7 microns and 2.0 microns. However, the plots at 1.5 volts were close to one another. For the experiments, the present inventor concluded that the white color was to be determined at 1.5 volts, because the gap dr was less influential in the tint. As described hereinbefore, the liquid crystal 13 exhibited the values of the reflectance to the three primary color light components less dispersed under the condition that the potential difference was equal to or greater than 1.5 volts. Visual images were to be produced in the range where the reflectance was less dispersed, because the tint was not seriously varied.

The present inventor found the following conditions to suppress the undesirable variation of color for reproducing a fine color image through a study on the simulation results. The gap for the liquid crystal and one of the minimum potential difference and the maximum potential difference were to be determined in such a manner that the reflectance of the liquid crystal layer 13 to one of the primary three color light components had an extreme value. The values of the reflectance to the primary three color light components were close to one another in the range higher than the minimum potential difference for the reflectance with the extreme value or in the range lower than the maximum potential difference for the reflectance with the extreme value. If visual images were produced in the range where the values of reflectance were close to one another, the colors were less dispersed so that fine visual images were achieved on the screen.

Especially, when the gap between the substrate structures 11 and 12 and either maximum or minimum potential difference were determined such that the reflectance of the liquid crystal layer 13 to the blue light component had an extreme value, the tint of the visual image was stable over the screen.

The horizontal orientation layers 11f/12b are held in contact with the liquid crystal 13. In this instance, the gap and the maximum/minimum potential differences are determined in such a manner that the liquid crystal molecules 13 incline under the application of the minimum potential difference and that the liquid crystal molecules 13 are vertically oriented under the condition that the maximum potential difference is applied between the pixel electrodes 11d and the coupler electrode 12a. In other words, the minimum potential difference is shifted toward the positive side with respect to the potential difference at which the liquid crystal molecules are horizontally oriented. This results in that the reflectance of the liquid crystal layer 13 to the blue light component has an extreme value. The reflectance of the red, green and blue light components are close to one another in the range greater than the minimum potential difference. This results in that the tint of a visual image is stable over the screen. The horizontal orientation layers 11f/12b are more reliable than the vertical orientation layers so that the semi-transparent type liquid crystal display device produces a stabile color image.

In the semi-transparent type liquid crystal display device shown in FIG. 6A, when the minimum potential difference is applied, the reflectance has a maximum value. The semi-transparent type liquid crystal display device produces a white screen at the minimum potential difference, and produces a black screen at the maximum. The liquid crystal molecules 13 are vertically oriented at the maximum potential difference, the light is perfectly shielded so that the screen exhibits good contrast. When the semi-transparent type liquid crystal display device produces the white screen, the liquid crystal molecules are inclined at 10 degrees or more with respect to the horizontal state so that the white screen is less bright than the screen produced by the horizontally oriented liquid crystal molecules. However, the twist angle is at zero, the white screen is brighter than the white screen of the prior art liquid crystal display device in which the twist angle is usually set to 72 degrees.

Tint in the Transmitting Region

The present inventor investigated the transmittance of the liquid crystal layer 13 to the primary three color light components in the transmitting area in terms of the potential difference applied across the liquid crystal layer 13. The present inventor set the gap df in the transmitting region to 3.0 microns, 3.5 microns, 4.0 microns and 4.5 microns, and measured the transmittance of the red, green and blue light components at different values of the potential difference. The present inventor plotted the transmittance on the condition that the gap df was 3.0, 3.5, 4.0 and 4.5 microns in FIGS. 9A to 9D, respectively. Focusing the potential difference at zero volt, the transmittance to the blue light component was rapidly reduced when the gap df was increased. The tendency of the transmittance at 1.5 volts was analogous to one another so that the gap dependency was weak. The tint of a white image at zero and 1.5 volts was illustrated in FIG. 10. Marks "x" stood for the white images at zero volt, and encircled dots represented the white images at 1.5 volts. The gap was varied from 3.0 microns through 3.5 microns and 4.0 microns to 4.5 microns.

Figure 10:
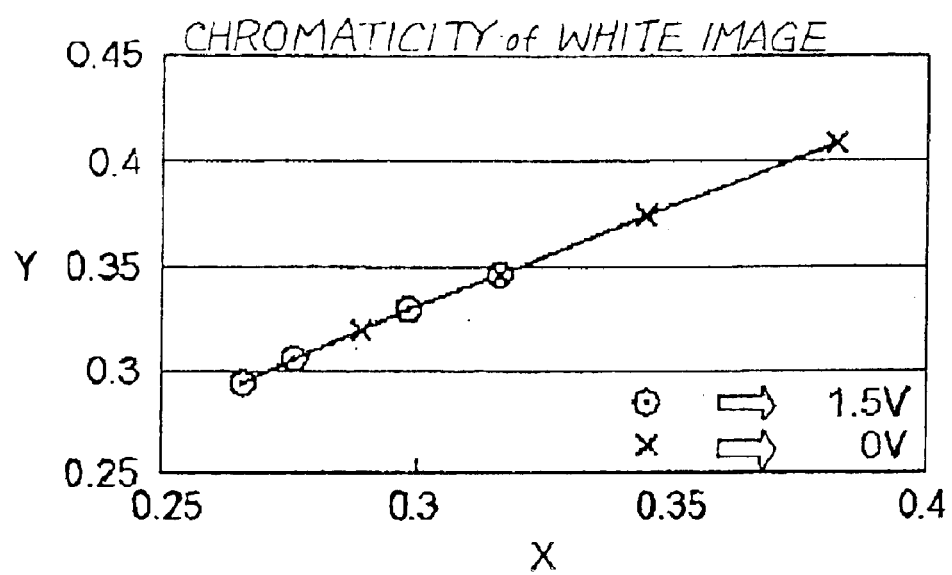
FIG. 10 is a graph showing chromaticity coordinates for a white image.

From FIGS. 8 and 10, the present inventor concluded that the gap df was to be 4.0 microns for adjusting the tint analogous to that of the white images at dr=1.7±0.3 microns. The transmittance of the liquid crystal layer 13 to the red, green and blue light components was close to one another in the region equal to and greater than 1.5 volts. Taking the teachings of FIGS. 9A to 9D into account, it was preferable to design the semi-transparent type liquid crystal display device under the conditions that the reflecting region 10 and transmitting region 7 had the above-described optimum gaps dr/df and that the minimum potential difference was adjusted to 1.5 volts for making the tint of visual images produced in both reflecting/transmitting regions 10/7 close to each other without unintentional dispersion of the tint.

The present inventor studied a design method for the transmitting regions through the simulation, and found the following preferable as follows. The gap and either minimum or maximum potential difference were to be adjusted in such a manner that the transmittance of the liquid crystal layer 13 to one of the red, green and blue light components has an extreme value. When the gap and the maximum/minimum potential difference were determined, the liquid crystal layer 13 exhibited the values of the transmittance to the red, green and blue light components close to one another in the region larger in value than the minimum potential difference or the region smaller in value than the maximum potential difference.

The present inventor further studied a design method for both reflecting and transmitting regions, and found the following preferable conditions on the premise that the minimum potential difference and maximum potential difference had been already optimized in the reflecting region. If the gap df at which the liquid crystal layer 13 exhibited the transmittance to the green light component was shifted to the positive side, the tint in the transmitting region at the minimum and maximum potential differences was made close to the tint in the reflecting region, and the color was less dispersed.

Figure 11:
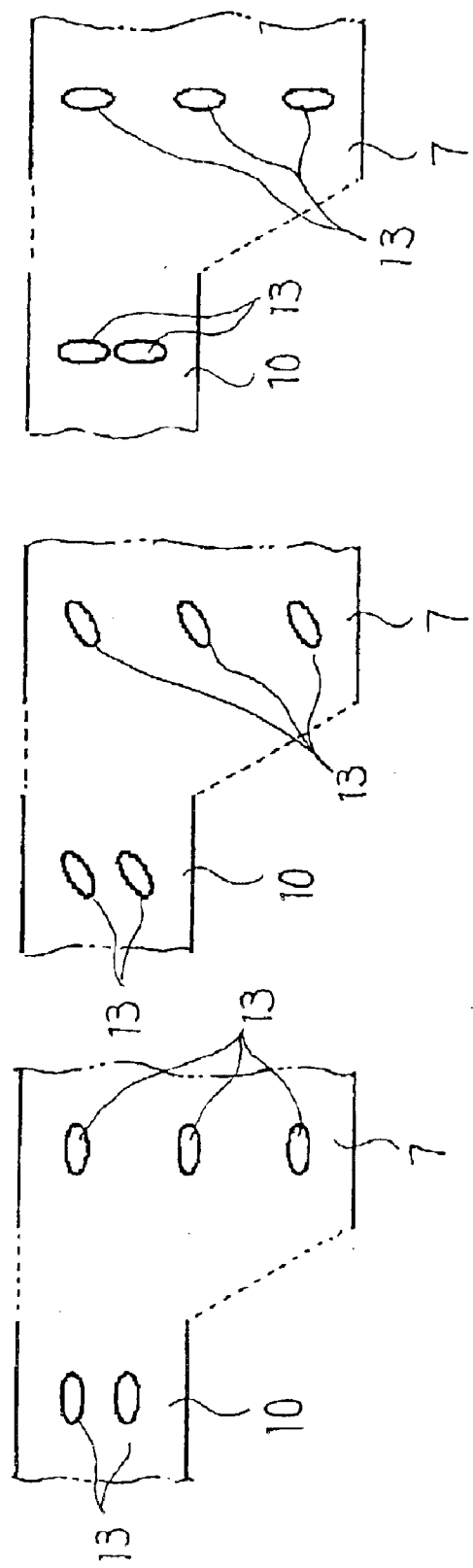
FIGS. 11A to 11C are schematic views showing the orientation of liquid crystal molecules at respective values of a potential difference.

FIGS. 11A to 11C show the orientation of the liquid crystal molecules 13 in the reflecting region 10 and transmitting region 7. When the potential difference is adjusted to zero, the liquid crystal molecules 13 are horizontally oriented in both reflecting and transmitting regions 10/7 as shown in FIG. 11A. If the potential difference is increased to 1.5 volts, the liquid crystal molecules 13 are inclined with respect to the horizontal direction by 10 degrees or more in both reflecting and transmitting regions 10/7 as shown in FIG. 11B, and the reflectance and transmittance to the blue light component are maximized. The semi-transparent liquid crystal display device produces the white screen. If the potential difference is further increased to 5 volts, the liquid crystal molecules 13 are vertically oriented in both transmitting and reflecting regions 7/10, and the semi-transparent liquid crystal display device produces the black screen.

Second Embodiment

Another semi-transparent type liquid crystal display device implementing the second embodiment has a thickness of liquid crystal and the minimum potential difference adjusted in such a manner that the reflectance of the liquid crystal layer to the blue light component has a minimum value at the minimum potential difference. The semi-transparent type liquid crystal display device is implemented by various structures. However, one of the simplest structures is shown in FIG. 12.

A difference between the first embodiment and the second embodiment is that the quarter wave plates 20a/20b are deleted from the semi-transparent type liquid crystal display device implementing the second embodiment. For this reason, the other component parts are labeled with the references designating corresponding component parts of the first embodiment without detailed description.

Figure 12:
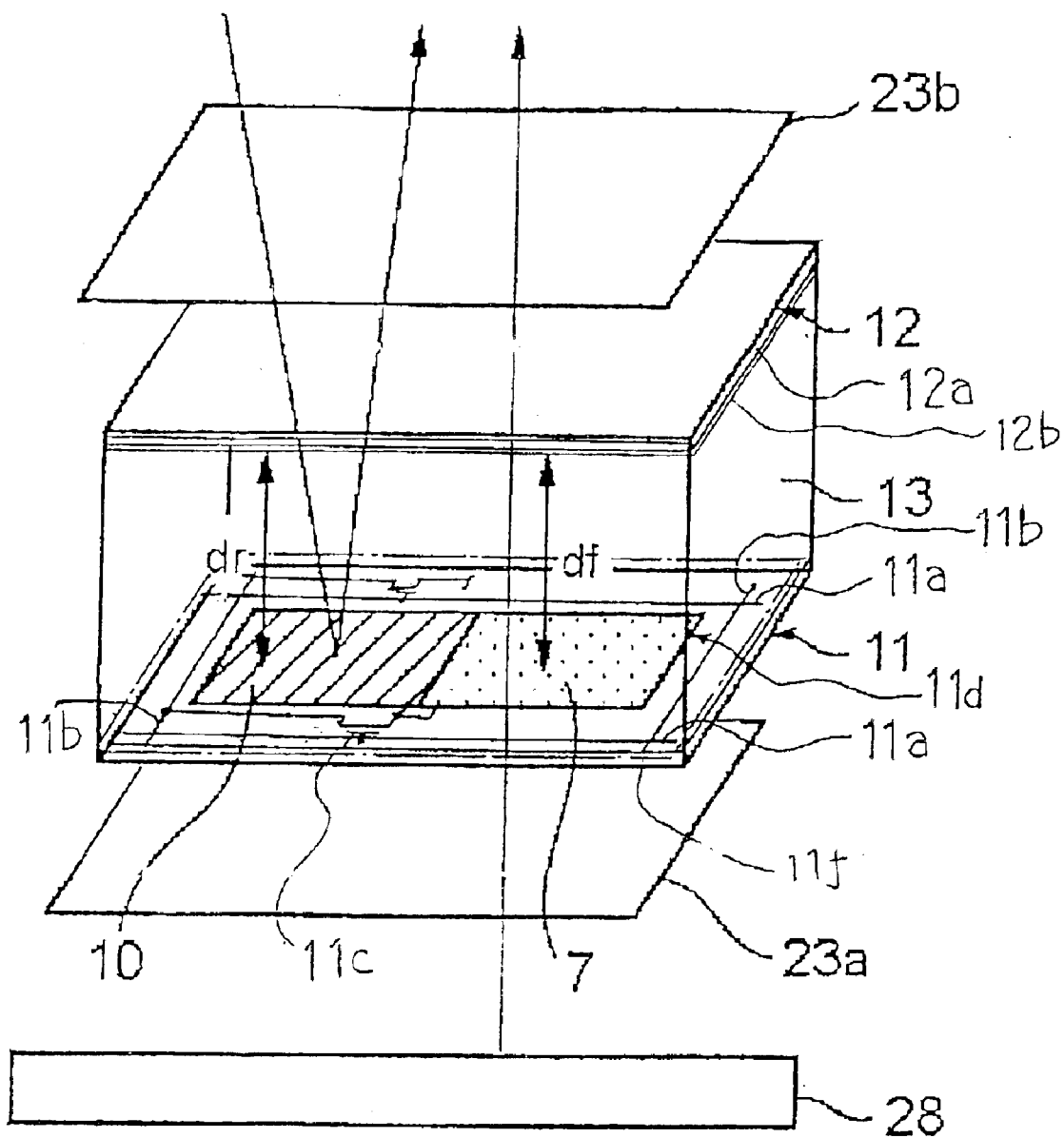
FIG. 12 is a schematic perspective view showing the structure of another semi-transparent type liquid crystal display device according to the present invention.
Figure 13:
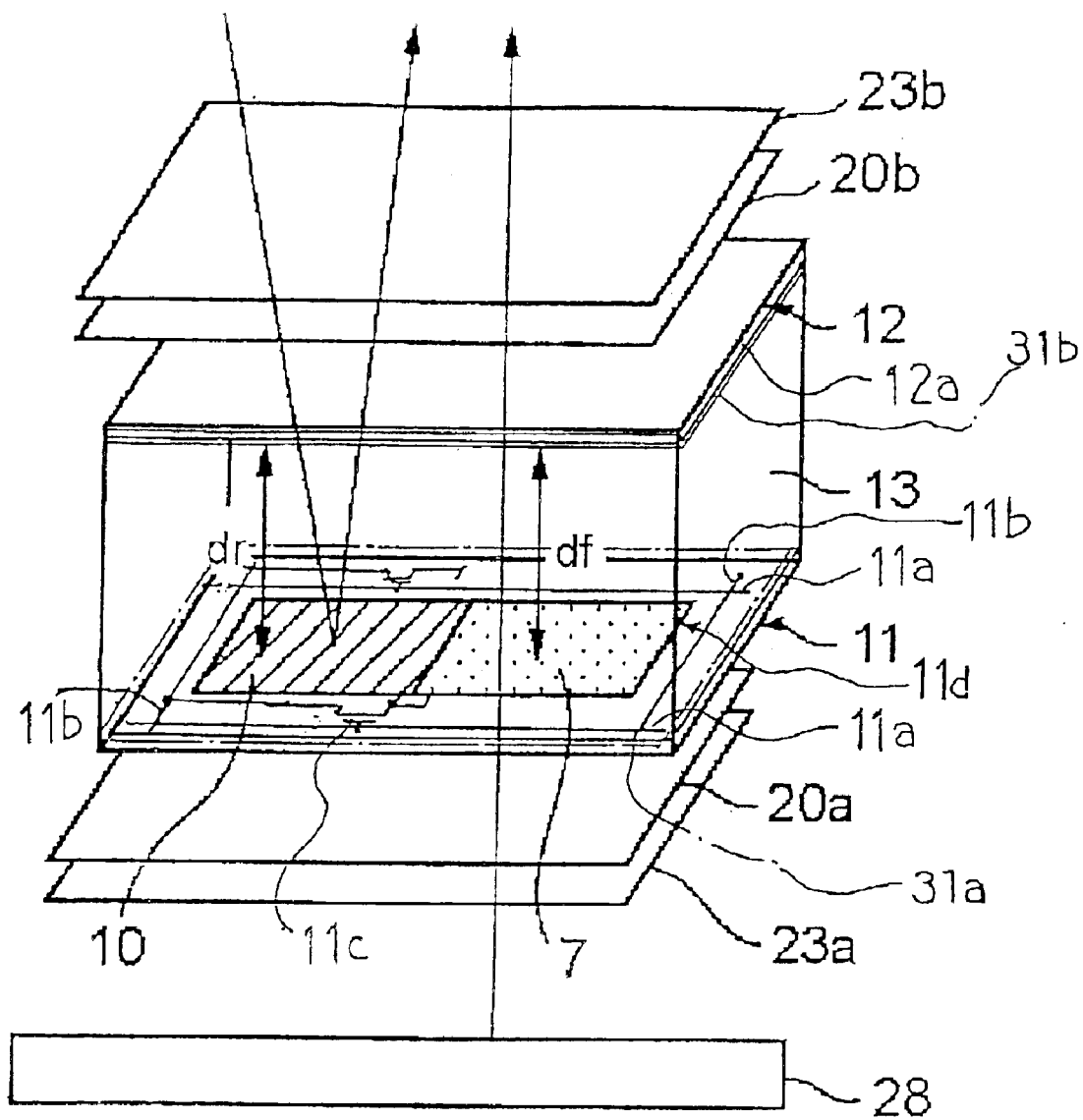
FIG. 13 is a schematic perspective view showing the structure of yet another semi-transparent type liquid crystal display device according to the present invention.

The semi-transparent type liquid crystal display device shown in FIG. 12 is of the normally black type. When the potential difference is removed from between the pixel electrodes 11d and the counter electrode 12a, the liquid crystal molecules are oriented in horizontal direction, and the semi-transparent type liquid crystal display device produces a black screen. On the other hand, when the liquid crystal molecules rise under application of the potential difference, the semi-transparent type liquid crystal display device produces a white screen. The gap dr is adjusted to an appropriate value. Then, when the environmental light is incident on the polarization plate 23b, the polarization plate 23b makes the environmental light linearly polarized, i.e., horizontally oriented, and reaches the reflection electrode 10 as a right-handed circularly polarized light. The environmental light is reflected on the reflection electrode 10, and is changed to the left-handed circularly polarized light. The reflected light passes through the liquid crystal layer 13, and is changed to a linearly polarized light 90 degrees different from the incident light. The linearly polarized light has the polarization axis perpendicular to the polarization plate 23b so that the reflection can not pass through the polarization plate 23b. This results in the black screen.

On the other hand, when the potential difference is applied between the pixel electrodes 11d and the counter electrode 12a, the liquid crystal molecules 13 are vertically oriented, and the environmental light, which is incident onto the liquid crystal layer 13 as a linearly polarized light, reaches the reflection electrode 10 without any rotation. The environmental light is reflected on the reflection electrode 10, and the reflected light passes through the liquid crystal layer 13 and the polarization plate 23b. For this reason, the linearly polarized light is output from the polarization plate 23b, and the semi-transparent type liquid crystal display panel produces the white screen.

The behavior of the back light is similar to that of the environmental light, and no further description is hereinafter incorporated for avoiding repetition.

Tint in Reflecting/Transmitting Regions

The present inventor investigated the tint in the reflecting/transmitting regions through a simulation as follows. The reflecting characteristics of the liquid crystal layer 13 to the red, green and blue light components were made close to one another under the potential difference equal to or greater than the minimum potential difference by adjusting the gap dr for the liquid crystal 13 and the minimum potential difference as described hereinbefore. When the semi-transparent type liquid crystal display device turned off, the liquid crystal molecules were horizontally oriented, and the screen became close to black. Thus, the semi-transparent liquid crystal display behaved like the normally-off type.

The gap df in the transmitting region 7 was to be adjusted in such a manner that the liquid crystal layer 13 exhibited a minimum value of the transmittance to the blue light component on the premise that the minimum potential difference and maximum potential difference had been optimized in the reflecting region 10 as similar to the first embodiment. The optimum gap df made the tint of a visual image in the transmitting region 7 under the application of the minimum/maximum potential differences very close to that in the reflecting region 10 and the dispersion of colors restricted.

In case where the liquid crystal layer 13 had been sandwiched between the horizontal orientation layers as similar to the first and second embodiments, the retardation, which was equivalent to the product between the double reflectance and the thickness of the liquid crystal layer 13, for making the reflectance to the green light component with 550 nanometer wavelength in the reflecting region 10 and the transmittance to the same green light in the transmitting region 7 maximized at the twist angle of zero was given as $$dn \cdot dr = \lambda/4 = 137.5 \text{ nm}$$

$$dn \cdot df = \lambda/2 = 275 \text{ nm}$$

However, the irregular color was serious at this retardation as described hereinbefore. In order to make the reflectance of the liquid crystal layer 13 to the red, green and blue light components close to one another, the retardation was to be shifted toward the direction to the large thickness. Then, the gap in the reflecting region 10 and the gap in the transmitting region 7 were changed to dr+ and df+, respectively. From the simulation results described in conjunction with the first embodiment, the gaps dr+ and df+ were given as $$dn \cdot dr+ = \lambda/4 + \alpha = 137.5 \text{ nm} + 8.7 \text{ nm} = 146.2 \text{ nm}$$

$$dn \cdot df+ = \lambda/2 + \beta = 270 \text{ nm} + 74 \text{ nm} = 344 \text{ nm}$$

The twist angle was assumed to be zero to 10 degrees as described hereinlater, and the tolerance was taken into account. Then, the gap for the liquid crystal layer 13 in the reflecting region was to be fallen within the range between 138 nm and 172 nm, and the gap for the liquid crystal layer 13 in the transmitting region was fallen within the range between 275 nm and 344 nm.

The present inventor confirmed that, when the gaps were fallen within the optimum ranges, respectively, the color irregularity was restricted, and the tint of a visual image was less varied for producing the fine color image on the screen.

Third Embodiment

Although the semi-transparent type liquid crystal display devices implementing the first and second embodiments includes the liquid crystal sandwiched between the horizontal orientation layers, yet another semi-transparent type liquid crystal display device embodying the present invention has a liquid crystal layer sandwiched between vertical orientation layers, i.e., VA liquid crystal. The semi-transparent type liquid crystal display device implementing the third embodiment is similar to the first embodiment except vertical orientation layers 31*a*/31*b*. For this reason, the other component parts are labeled with the same references designating the corresponding component parts of the first embodiment without detailed description for the sake of simplicity.

Tint in Reflecting Region

Figure 14A:
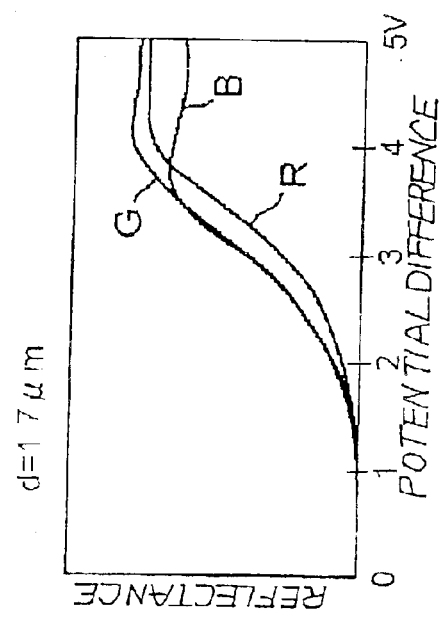
FIGS. 14A to 14C are graphs showing relation between the reflectance and the potential difference at difference values of gap between the substrate structures.
Figure 14B:
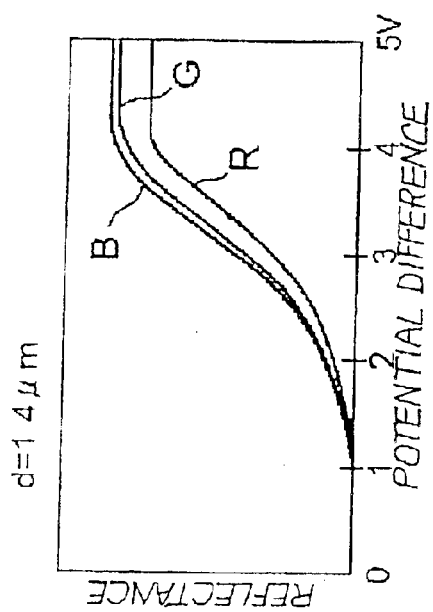
Figure 14C:
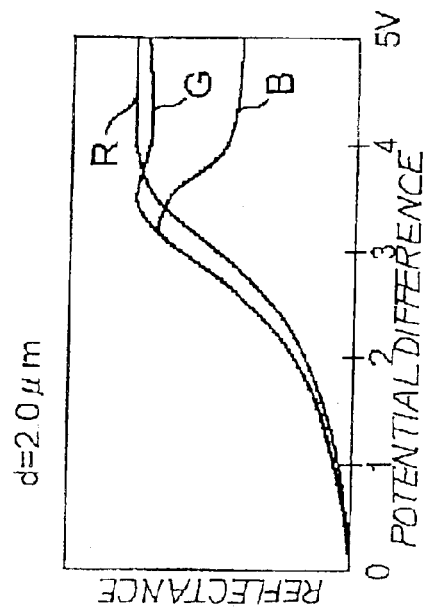
Figure 15B:
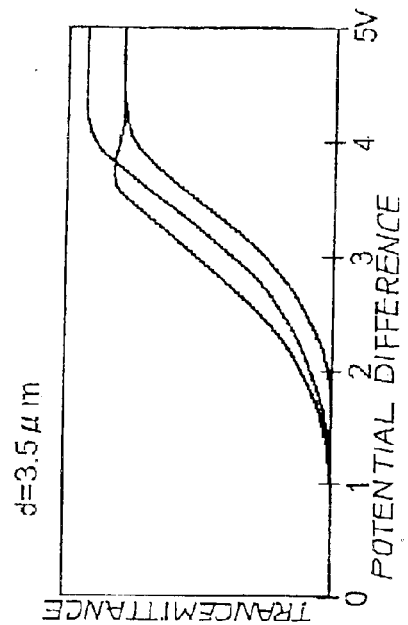
FIGS. 15A to 15D are graphs showing relation between the transmittance and the potential difference at difference values of gap between the substrate structures.
Figure 15D:
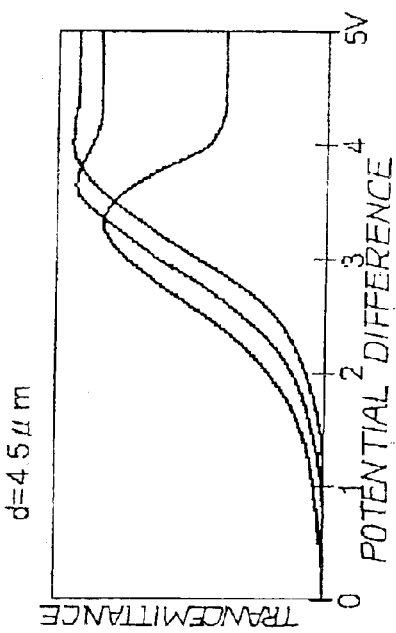
Figure 15A:
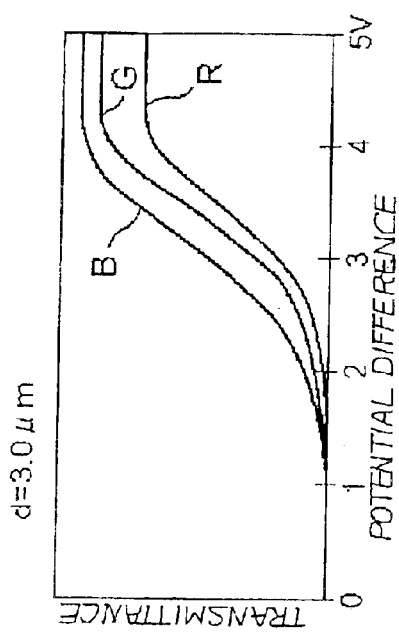
Figure 15C:
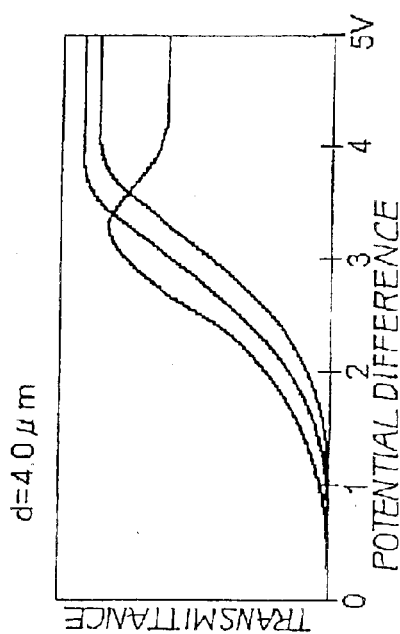

The present inventor arranged the optical components as described hereinbefore, and studied the optimum conditions through a simulation. The present inventor set the gap dr in the reflecting region 10 to 1.4 microns, 1.7 microns and 2.0 microns, and investigated the relation between the potential difference and the reflectance of the liquid crystal layer 13 to the red, green and blue light components. The present inventor plots the reflectance in terms of the potential difference as shown in FIGS. 14A, 14B and 14C. The plots R/G/B in FIGS. 14A, 14B and 14C were mirror images of the plots R/G/B in FIGS. 7A, 7B and 7C.

When the gap dr and potential difference were adjusted to 1.7 microns and 3.5 volts, the reflectance of the liquid crystal layer 13 to the blue light component had a maximum value. As would be seen in FIGS. 14A, 14B and 14C, the values of the reflectance to the red, green and blue light components were equal to or close to one another in the region equal to or less than 3.5 volts. The present inventor plotted the tint of a white image at 3.5 volts and 5 volts in the chromaticity coordinates, and confirmed that the plots were located in the chromaticity coordinates as similar to those in FIG. 8. Thus, although the gap was changed, the tint was less varied at 3.5 volts rather than the tint at 5 volts.

When the potential difference was removed from between the pixel electrodes 11*d* and the counter electrode 12*a*, the liquid crystal molecules 13 were vertically oriented, and the semi-transparent liquid crystal display device produced a black screen. Thus, the minimum potential difference and maximum potential difference were optimized at zero and 3.5 volts, respectively. This resulted in that visual images were produced in the range where the values of the reflectance of the liquid crystal layer 13 were close to one another. In other words, the image production in the optimum range was effective against the irregular color and undesirable variation of the tint.

Tint in Transmitting Region

The present inventor set the gap df to 3.0 microns, 3.5 microns, 4.0 microns and 4.5 microns, and investigated the transmittance in the transmitting region 7 in terms of the potential difference applied across the liquid crystal layer 13. The present inventor determined the transmittance, and plotted the values of the transmittance in terms of the potential difference as shown in FIGS. 15A to 15D. Comparing the plots in FIGS. 15A to 15D with the plots in FIGS. 9A to 9D, the present inventor confirmed that the plots in FIGS. 15A to 15D were mirror images of the plots in FIGS. 9A to 9D. In case where the gap df was adjusted to 4.0 microns, the transmittance to the blue light component had a maximum value at 3.5 volts, and the values of the transmittance to the red, green and blue light components were close to one another at the difference values of the gap as shown in FIGS. 15A to 15D. The present inventor plotted the tint of a white image in the chromaticity coordinates at 3.5 volts and 5 volts, and confirmed that the tint in the chromaticity coordinates was same as that in FIG. 10.

As will be understood from the foregoing description, the gap in the transmitting region is determined in such a manner that the transmittance of the liquid crystal to the blue light component has a maximum on the premise that the minimum potential difference and the maximum potential difference are optimized in the reflecting region. As a result, when the minimum potential difference to the maximum potential difference is applied across the liquid crystal, the tint of a visual image in the transmitting region is made close to the tint of a visual image in the reflecting region, and the color irregularity is restricted.

FIGS. 16A to 16C show the orientation of the liquid crystal molecules 13. When any potential difference is not applied across the liquid crystal layer 13, the liquid crystal molecules 13 are vertically oriented in both reflecting and transmitting regions 10/7 as shown in FIG. 16A, and the semi-transparent type liquid crystal display device produces a black screen. If the potential difference is increased to 3.5 volts, the liquid crystal molecules 13 are inclined by 10 degrees or more with respect to the horizontally oriented liquid crystal molecules (see FIG. 16B), and the liquid crystal layer has the maximum reflectance and the maximum transmittance to the blue light component. The semi-transparent liquid crystal display device produces a white screen. When the potential difference is further increased to 5 volts, the liquid crystal molecules 13 are horizontally oriented as shown in FIG. 16C.

The liquid crystal layer 13 is sandwiched between the vertical orientation layers 31a and 31b. The liquid crystal molecules 13 are inclined at 10 degrees or more under the application of the maximum potential difference, and are vertically oriented under the application of the minimum potential difference. If the minimum potential difference is zero volt, the semi-transparent type liquid crystal display device produces the screen under the application of the minimum potential difference same as the screen in the off-state, i.e., the normally black type semi-transparent liquid crystal display device is obtained.

The normally off type liquid crystal display device is achieved by causing the liquid crystal layer 13 to exhibit the maximum value of the reflectance to one of the red, blue and green light components under the application of the maximum potential difference. Moreover, the minimum potential difference and the maximum potential difference are respectively adjusted to zero volt and 3.5 volts. The potential range for the image production, i.e., the potential range between zero and 3.5 volts is lower than the potential different at which the liquid crystal molecules 13 are horizontally oriented. For this reason, only one positive potential level is required for the image production, and the semi-transparent type liquid crystal display device is operable in the low potential range.

In the third embodiment having the liquid crystal layer 13 sandwiched between the vertical orientation layers 31a/31b, the retardation, in which the reflectance in the reflecting region 10 and the transmittance in the transmitting region 7 are maximized to the green light component with 550 nm wavelength, is given as $dn \cdot dr = \lambda/4 = 137.5$ nm $dn \cdot df = \lambda/2 = 270$ nm where dn is the double reflectance, dr is the gap in the reflecting region, i.e., the thickness of the liquid crystal layer in the reflecting region and df is the gap in the transmitting region, i.e., the thickness of the liquid crystal layer in the transmitting region. In this instance, the double reflectance dn is 0.086.

However, the irregular color takes place in the above-described values of the thickness. The thickness is slightly increased so as to make reflectance of the liquid crystal layer to the red, green and blue light components close to one another. The liquid crystal layer 13 is increased to dr+ in the reflecting region and to df+ in the transmitting region. From the simulation results in the third embodiment, the thickness of the liquid crystal layer 13 is given as $dn \cdot dr+ = \lambda/4 + \alpha = 137.5$ nm $+ 8.7$ nm $= 146.2$ nm $dn \cdot df+ = \lambda/2 + \beta = 270$ nm $+ 74$ nm $= 344$ nm where $\alpha$ and $\beta$ are the amount of retardation shifted corresponding to the increments of thickness.

Taking the tolerance into account, the retardation of the liquid crystal layer 13 in the reflecting region ranges from 138 nm to 172 nm, and the retardation of the liquid crystal 13 in the transmitting region ranges from 275 nm and 344 nm.

When the gaps dr and df, minimum potential difference and maximum potential difference are adjusted as described hereinbefore, the color irregularity is restricted, and the stability in tint is enhanced.

Fourth Embodiment

A semi-transparent type liquid crystal display device implementing the fourth embodiment is similar in structure to the first embodiment or second embodiment. For this reason, description is hereinafter made on the semi-transparent liquid crystal display device implementing the fourth embodiment with reference to FIG. 6A.

Figure 17:
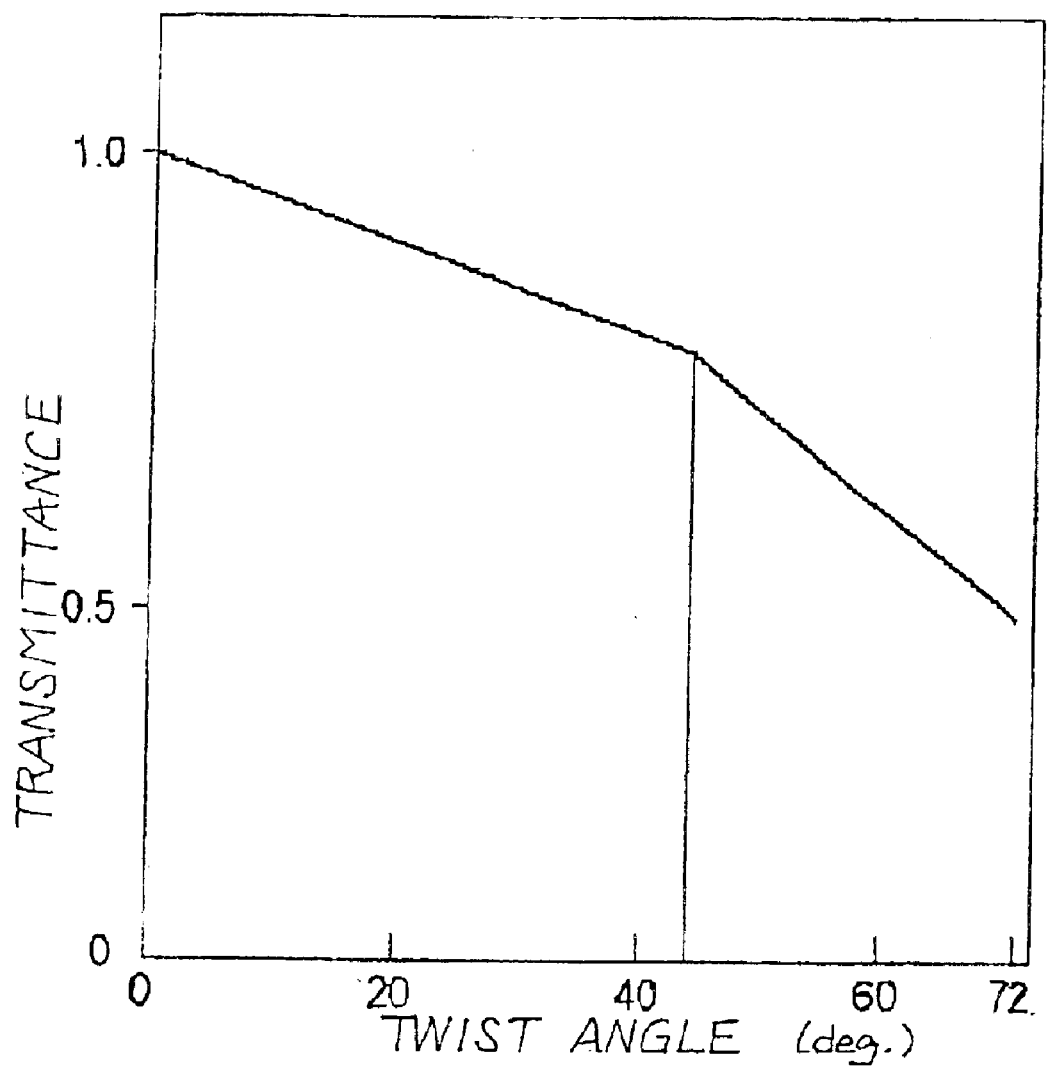
FIG. 17 is a graph showing relation between a twist angle and a transmittance of liquid crystal layer.

The semi-transparent type liquid crystal display device implementing the fourth embodiment aims at further improvement in the color irregularity. FIG. 17 shows a simulation result for relation between the twist angle and the transmittance of the liquid crystal layer 13 sandwiched between the horizontal orientation layers 11f and 12b. When the twist angle was zero degree, the transmittance was plotted at 1.0. If the twist angle was increased to 45 degrees, the transmittance was decreased to 0.75. If the twist angle was further increased to 72 degrees, the transmittance was plotted at 0.5.

Figure 18:
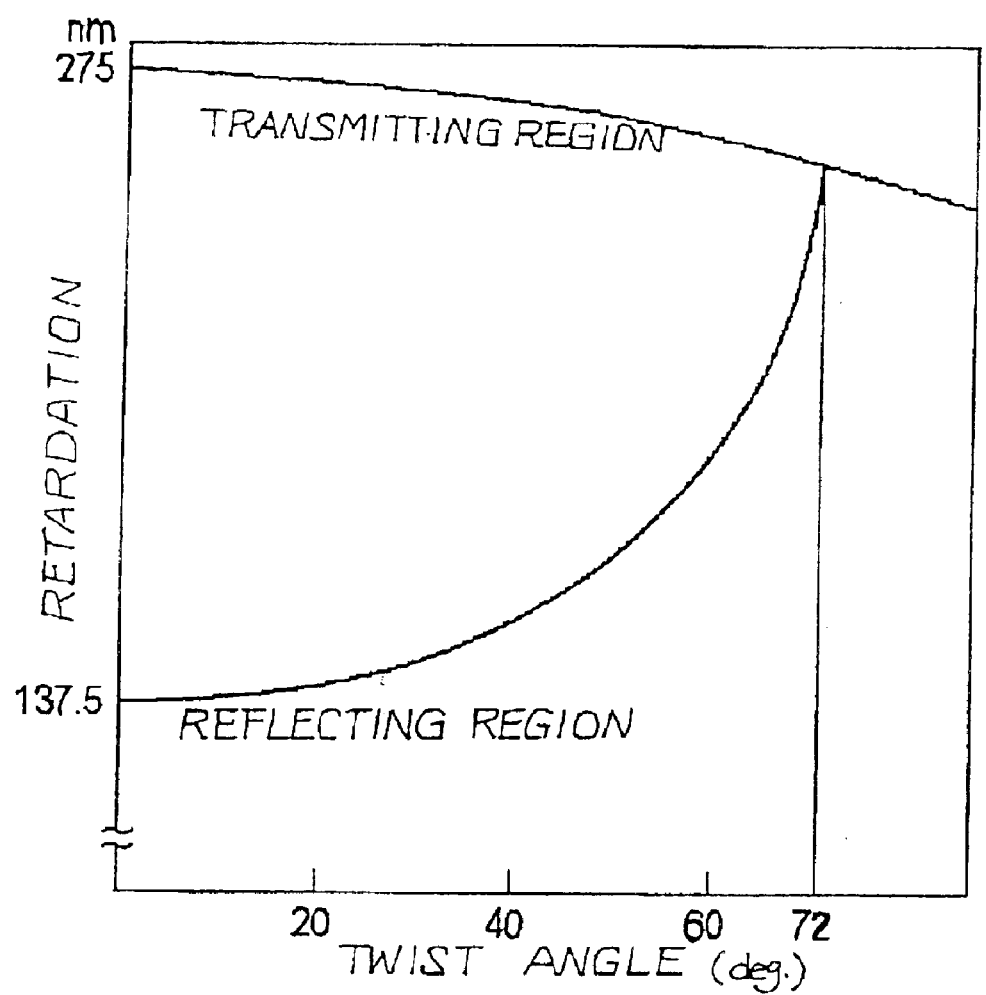
FIG. 18 is a graph showing relation between the twist angle and the retardation of the liquid crystal layer for making the reflectance to the green light component in the reflecting region and the transmittance to the green light component in the transmitting region maximum.

FIG. 18 shows relation between the twist angle and the retardation of the liquid crystal layer 13 for making the reflectance to the green light component in the reflecting region and the transmittance to the green light component in the transmitting region maximum. As described hereinbefore, the retardation shown in FIG. 18 made the color irregularity serious under the twist angle of zero. In order to overcome the serous color irregularity, the gap or the thickness of the liquid crystal layer 13 and the minimum potential difference were determined in such a manner that the liquid crystal molecules were obliquely oriented under the application of the minimum potential difference and vertically oriented under the application of the maximum potential difference in the first and second embodiments. In order words, the minimum potential difference was shifted to the positive value from the certain positive value at which the liquid crystal molecules were horizontally oriented. This resulted in that the values of the reflectance of the liquid crystal layer 13 to the red, green and blue light components became close to one another. By virtue of the equalized reflectance to the red, green and blue light components, the color irregularity was restricted. This minimum potential difference was hereinafter referred to as "optimum potential difference".

Figure 19:
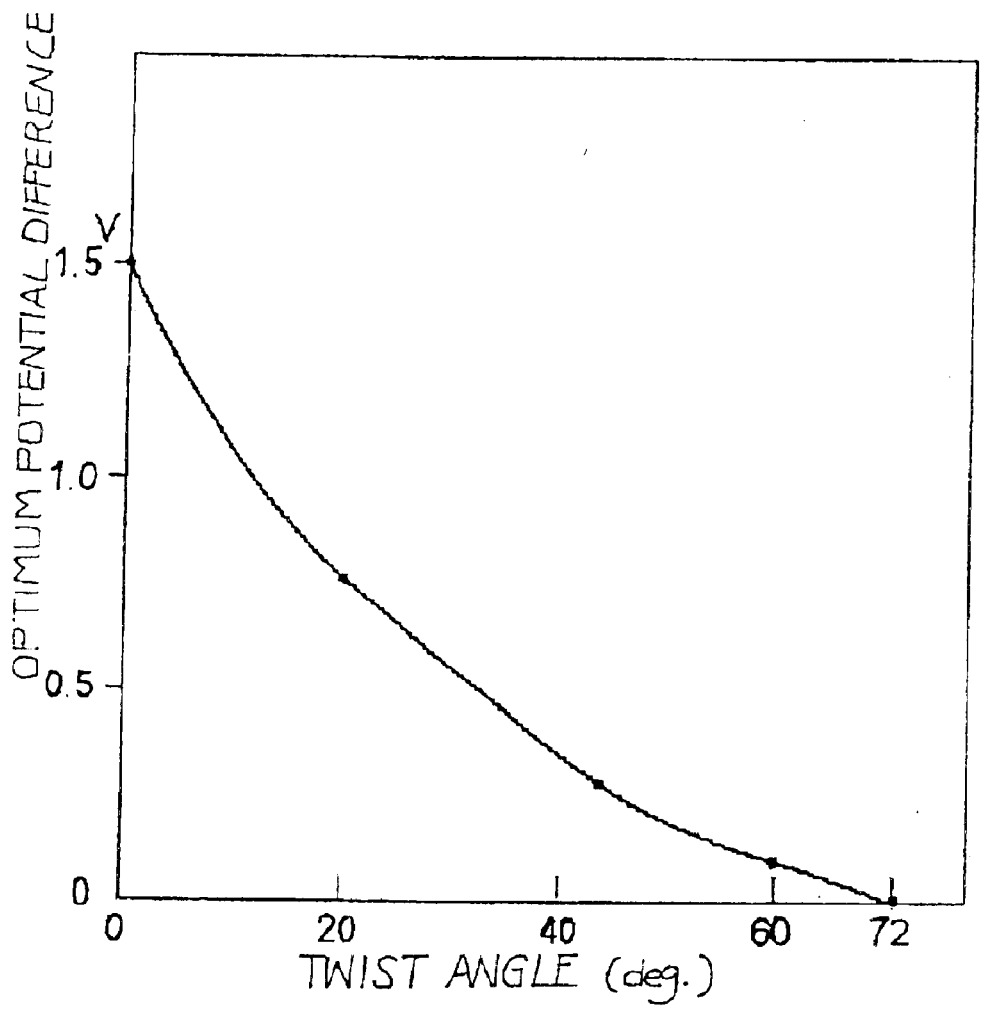
FIG. 19 is a graph showing relation between twist angle and an optimum potential difference.

FIG. 19 shows a simulation result for relation between the twist angle and the optimum potential difference. (X1, Y1) and (X2, Y2) were indicative of the dispersion of X/Y values of the reflectance in the chromaticity coordinates for a white image on the premise that the reflection plate had the surface roughness of ±0.3 micron. In other words, (X1, Y1) was indicative of the coordinates of the white image at the bottom of a recess on the surface of the reflection plate, and (X2, Y2) was indicative of the coordinates of the white image at the top of a projection on the surface of the reflection plate. The color irregularity was defined as $\{(X1-X2)^2 + (Y1-Y2)^2\}^{1/2}$ Plots A stood for the color irregularity when the minimum potential difference was adjusted to the optimum potential difference. On the other hand, plots B were indicative of the color irregularity when the minimum potential difference was zero. Comparing plots A with plots B, it was understood that the semi-transparent type liquid crystal display devices implementing the first, second and third embodiments were effective against the color irregularity, because the minimum potential difference was equal to the optimum potential difference.

As shown in FIG. 17, the smaller the twist angle, the higher the transmittance. In other words, when the twist angle is large, the semi-transparent type liquid crystal display device achieves a high luminance. On the other hand, it was understood that, when the twist angle was small, the color irregularity became serious. The degree of the color irregularity was dependent on the application of the liquid crystal display device.

The color irregularity indicated by plots A between zero and 72 degrees does not always satisfy the users. In case where the luminance is prioritized, the twist angle is to be equal to or less than 10 degrees, and semi-transparent type liquid crystal display devices with the large luminance are categorized in the first group. In case where the luminance is to be balanced with the color regularity, the twist angle is to be fallen within the range between 10 degrees and 45 degrees, and semi-transparent type liquid crystal display devices with the luminance well balanced with the color regularity are categorized in the second group. In case where the color regularity is prioritized, the twist angle is to be equal to or greater than 45 degrees, and semi-transparent type liquid crystal display devices with good color regularity are categorized in the third group.

Description on the semi-transparent liquid crystal display devices in the third group will be omitted. The semi-transparent type liquid crystal display devices implementing the first, second and third embodiments belong to the first group. The semi-transparent type liquid crystal display device implementing the fourth embodiment belongs to the third group.

Figure 20:
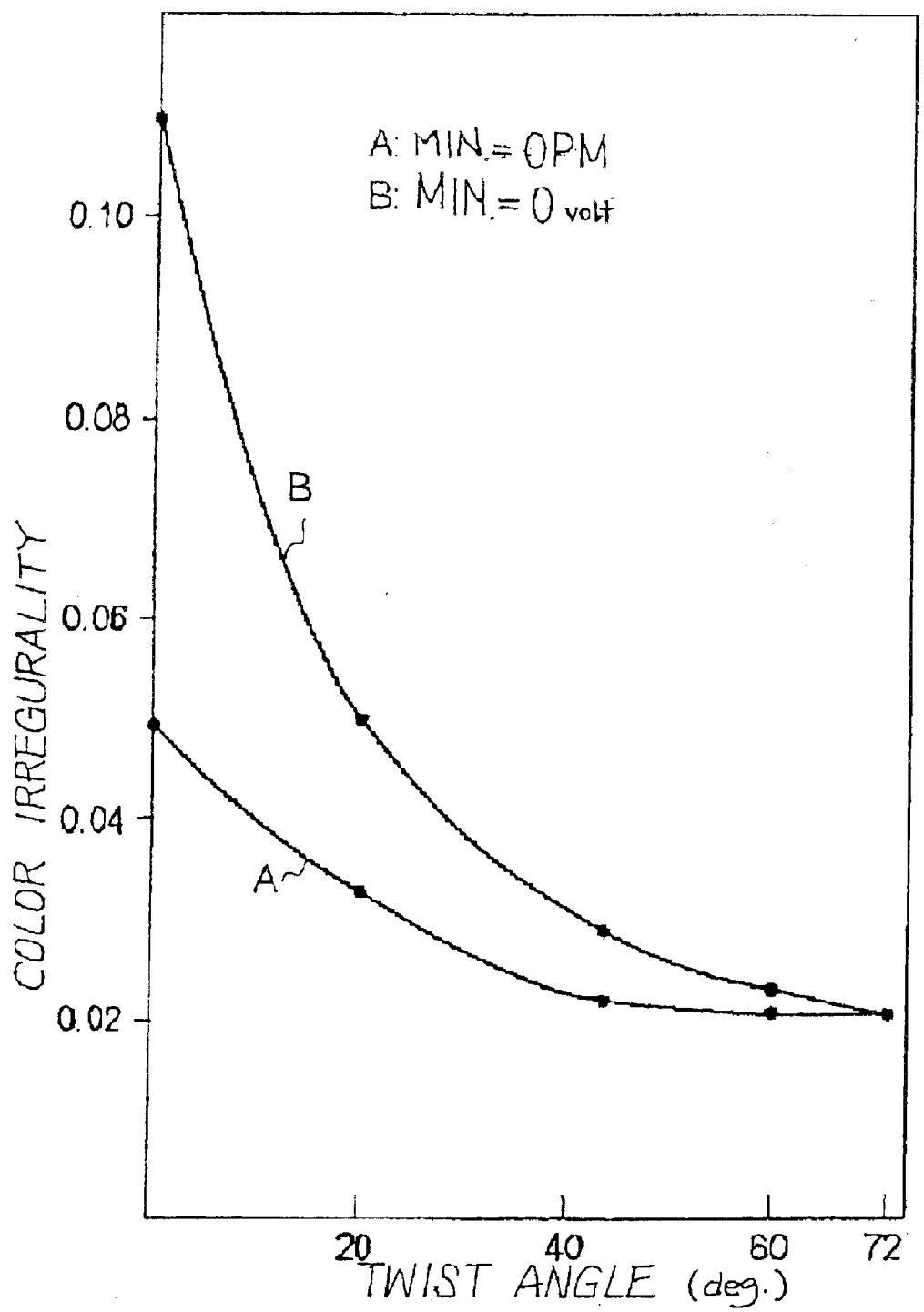
FIG. 20 is a graph showing color irregularity and the twist angle.

As described hereinbefore, the semi-transparent type liquid crystal display device implementing the fourth embodiment is similar in structure to the first embodiment or second embodiment. The difference is the twist angle of horizontal orientation layers. When the minimum potential difference is applied across the liquid crystal layer 13, the liquid crystal molecules are obliquely oriented. On the other hand, when the maximum potential difference is applied, the liquid crystal molecules are vertically oriented. The minimum potential difference is greater than the certain potential difference at which the liquid crystal molecules are horizontally oriented. By virtue of the minimum potential difference, the liquid crystal layer 13 exhibits the values of the reflectance to the red, green and blue light components close to one another so that the color irregularity is improved. Moreover, the twist angle between the horizontal orientation layers on the substrate structures 11/12 is fallen within the range between 10 degrees and 45 degrees. This results in that the difference between the minimum potential difference and the certain potential difference is reduced rather than the semi-transparent type liquid crystal display devices in the first group. This feature is desirable, because the color irregularity is suppressed as will be understood from FIG. 20. Furthermore, the retardation of the liquid crystal layer 13 is reduced as will be understood from FIG. 18. Thus, the semi-transparent type liquid crystal display device implementing the fourth embodiment suppresses the color irregularity, and well balances the regularity of tint with the utilization factor of the light.

As will be appreciated from the foregoing description, the following advantages are achieved by the present invention.

Although particular embodiments of the present invention have been shown and described, it will be apparent to those skilled in the art that various changes and modifications may be made without departing from the spirit and scope of the present invention.

The present invention is applicable to the reflection type liquid crystal display devices. In the reflection type liquid crystal display devices according to the present invention, the wavelength dispersion is small, and the luminance is large. Moreover, the reflection type liquid crystal display devices are driven by using a low potential level.

What is claimed is:

1. A reflection type or semi-transparent type liquid crystal display device comprising:
    two substrate structures spaced from each other, and including electrodes selectively formed therein so as to be selectively applied with a minimum potential difference and a maximum potential difference for creating local electric fields and color filters formed in one of said two substrate structures; and
    a liquid crystal layer confined in the space between said two substrate structures, and locally changed between a transparent state and a non-transparent state in the presence of said local electric fields for producing a color visual image,
    the thickness of said liquid crystal layer and one of said minimum and maximum potential differences being determined in such a manner that a reflectance of said liquid crystal layer to one of a red, green or blue light components has an extreme value when said one of said minimum and maximum potential differences is applied between selected ones of said electrodes.

2. The reflection type or semi-transparent type liquid crystal display device as set forth in claim 1, in which said two substrate structures have horizontal orientation layers, respectively, so that the liquid crystal molecules of said liquid crystal layer are obliquely oriented under application of said minimum potential difference and vertically oriented under application of said maximum potential difference.

3. The reflection type or semi-transparent type liquid crystal display device as set forth in claim 2, in which said reflectance to said one of said red, green and blue light components has the maximum value when said minimum potential difference is applied.

4. The reflection type or semi-transparent type liquid crystal display device as set forth in claim 2, in which said reflectance to said one of said red, green and blue light components has the minimum value when said minimum potential difference is applied.

5. A reflection type or semi-transparent type liquid crystal display device comprising:
    two substrate structures spaced from each other, and including electrodes selectively formed therein so as to be selectively applied with a minimum potential difference and a maximum potential difference for creating local electric fields and color filters formed in one of said two substrate structures; and
    a liquid crystal layer confined in the space between said two substrate structures, and locally changed between a transparent state and a non-transparent state in the presence of said local electric fields for producing a color visual image,
    the thickness of said liquid crystal layer and one of said minimum and maximum potential differences being determined in such a manner that a reflectance of said liquid crystal layer to one of a red, green or blue light components has an extreme value when said one of said minimum and maximum potential differences is applied between selected ones of said electrodes, wherein said two substrate structures have horizontal orientation layers, respectively, so that the liquid crystal molecules of said liquid crystal layer are obliquely oriented under application of said minimum potential difference and vertically oriented under application of said maxi-mum potential difference, and wherein a twist angle between said horizontal orientation layers is equal to or less than 10 degrees.

6. The reflection type or semi-transparent type liquid crystal display device as set forth in claim 5, in which a retardation of said liquid crystal layer has a mean value between 138 nanometers and 172 nanometers.

7. A reflection type or semi-transparent type liquid crystal display device comprising:

two substrate structures spaced from each other, and including electrodes selectively formed therein so as to be selectively applied with a minimum potential difference and a maximum potential difference for creating local electric fields and color filters formed in one of said two substrate structures; and a liquid crystal layer confined in the space between said two substrate structures, and locally changed between a transparent state and a non-transparent state in the presence of said local electric fields for producing a color visual image, the thickness of said liquid crystal layer and one of said minimum and maximum potential differences being determined in such a manner that a reflectance of said liquid crystal layer to one of a red, green or blue light components has an extreme value when said one of said minimum and maximum potential differences is applied between selected ones of said electrodes, wherein said two substrate structures have horizontal orientation layers, respectively, so that the liquid crystal molecules of said liquid crystal layer are obliquely oriented under application of said minimum potential difference and vertically oriented under application of said maxi-mum potential difference, and wherein a twist angle between said horizontal orientation layers falls within a range of between 10 degrees and 45 degrees.

8. The reflection type or semi-transparent type liquid crystal display device as set forth in claim 7, in which a retardation of said liquid crystal layer has a mean value between 123 nanometers and 157 nanometers.

9. The reflection type or semi-transparent type liquid crystal display device as set forth in claim 1, in which said two substrate structures have vertical orientation layers, respectively, so that the liquid crystal molecules of said liquid crystal layer are obliquely oriented under application of said maximum potential difference and vertically oriented under application of said minimum potential difference.

10. The reflection type or semi-transparent type liquid crystal display device as set forth in claim 9, in which said reflectance to said one of said red, green and blue light components has the maximum value when said maximum potential difference is applied.

11. The reflection type or semi-transparent type liquid crystal display device as set forth in claim 9, in which a retardation of said liquid crystal layer has a mean value between 138 nanometers and 172 nanometers.

12. A semi-transparent type liquid crystal display device comprising:

a first substrate structure including signal lines, thin film transistors selectively connected to said signal lines so as to be selectively changed between on-state for propagating data signals and off-state, reflecting electrodes connected to the associated thin film transistors for receiving said data signals in said on-state and transparent electrodes respectively paired with said reflecting electrodes and connected to said associated thin film transistors for receiving said data signals in said on-state;

a second substrate structure including a counter electrode opposed to the pairs of reflecting and transparent electrodes for creating local electric fields; and a liquid crystal layer confined between said first substrate and said second substrate, and applied with a minimum potential difference and a maximum potential difference between said pairs of reflecting and transparent electrodes and said counter electrode for partially becoming transparent in the presence of said local electric fields, the liquid crystal molecules of said liquid crystal layer between said reflecting electrodes and said counter electrode and between said transparent electrodes and said counter electrode being oriented in a direction inclined from both of the horizontally oriented state and the vertically oriented state by a certain angle equal to or greater than 10 degrees in the presence of one of said minimum and maximum potential differences.

13. The semi-transparent type liquid crystal display device as set forth in claim 12, in which said liquid crystal molecules are in said horizontally oriented state without any potential difference between said pairs of reflecting and transparent electrodes and said counter electrode, and said minimum potential difference is equal to or greater than 0.5 volt.

14. The semi-transparent type liquid crystal display device as set forth in claim 12, in which liquid crystal molecules are in said vertically oriented state when said minimum potential difference is applied, and said minimum potential difference is equal to or less than 0.5 volt.

15. A semi-transparent type liquid crystal display device comprising:

two substrate structures selectively formed with electrodes and having reflecting regions for reflecting light incident thereonto and transparent regions for passing back light; and a liquid crystal layer confined in a space between said two substrate structures, and selectively applied with a minimum potential difference and a maximum potential difference so as to be locally changed between a transparent state and a non-transparent state for producing a color visual image, a gap in said transparent regions and one of said minimum and maximum potential differences being determined in such a manner that a reflectance of said liquid crystal layer to one of a red, green or blue light components has an extreme value.

16. The semi-transparent type liquid crystal display device as set forth in claim 15, in which said two substrate structures have respective horizontal orientation layers held in contact with said liquid crystal layer, and the liquid crystal molecules are obliquely oriented in the presence of said minimum potential difference and vertically oriented in the presence of said maximum potential difference.

17. The semi-transparent type liquid crystal display device as set forth in claim 15, in which said two substrate structures have respective vertical orientation layers held in contact with said liquid crystal layer, and the liquid crystal molecules are obliquely oriented in the presence of said maximum potential difference and vertically oriented in the presence of said minimum potential difference.

* * * * *